United States Patent
Sinha

(10) Patent No.: US 12,541,377 B2
(45) Date of Patent: Feb. 3, 2026

(54) SYSTEMS, METHODS AND COMPUTER PROGRAM PRODUCTS FOR REMOTE DATA RETRIEVAL FROM COMPUTING DEVICES

(71) Applicant: Spillbox Inc., San Jose, CA (US)

(72) Inventor: Alok Kumar Sinha, San Jose, CA (US)

(73) Assignee: Spillbox Inc., San Jose, CA (US)

( * ) Notice: Subject to any disclaimer, the term of this patent is extended or adjusted under 35 U.S.C. 154(b) by 434 days.

(21) Appl. No.: 18/206,744

(22) Filed: Jun. 7, 2023

(65) Prior Publication Data

US 2024/0411567 A1    Dec. 12, 2024

(51) Int. Cl.
*G06F 9/445* (2018.01)

(52) U.S. Cl.
CPC .................. *G06F 9/44521* (2013.01)

(58) Field of Classification Search
None
See application file for complete search history.

(56) References Cited

U.S. PATENT DOCUMENTS

| | | | |
|---|---|---|---|
| 5,987,521 A * | 11/1999 | Arrowood | H04L 45/22 709/239 |
| 7,743,019 B2 | 6/2010 | Shah et al. | |
| 8,112,505 B1 | 2/2012 | Ben-Shaul et al. | |
| 9,251,114 B1 | 2/2016 | Ancin et al. | |
| 9,398,087 B1 | 7/2016 | Hosie et al. | |
| 9,781,191 B2 | 10/2017 | Kashyap | |
| 10,146,788 B1 | 12/2018 | Weatherall et al. | |
| 10,148,493 B1 | 12/2018 | Ennis, Jr. et al. | |
| 10,893,106 B1 | 1/2021 | Saladi et al. | |
| 11,169,864 B2 | 11/2021 | Ranjan et al. | |
| 2007/0244987 A1 | 10/2007 | Pedersen et al. | |
| 2012/0072898 A1 | 3/2012 | Pappas et al. | |
| 2012/0084333 A1 | 4/2012 | Huang et al. | |
| 2014/0007079 A1 | 1/2014 | Whitney et al. | |
| 2014/0172783 A1 | 6/2014 | Suzuki et al. | |
| 2014/0258872 A1 | 9/2014 | Spracklen et al. | |
| 2014/0351388 A1 * | 11/2014 | Srinivasan | H04L 67/1097 709/219 |
| 2015/0088942 A1 | 3/2015 | Shah | |
| 2015/0193514 A1 | 7/2015 | Bradshaw et al. | |
| 2015/0278323 A1 | 10/2015 | Melahn et al. | |
| 2015/0286389 A1 | 10/2015 | Conover et al. | |

(Continued)

OTHER PUBLICATIONS

International Search Report for PCT/IB2020/060778 mailed May 13, 2021. 2 pgs.

*Primary Examiner* — Craig C Dorais
(74) *Attorney, Agent, or Firm* — Lerner David LLP

(57) ABSTRACT

The invention provides systems, methods and computer program products for executing remote application iteration(s) of client application software on a remote server platform, and for enabling each remote application iteration of a client application software to have access to a corresponding instance of an application software environment that has access to all data objects necessary for execution of such remote application iteration. The invention additionally enables execution of a remote application iteration of a client software application at a remote server platform, through need-based or dynamic retrieval of data objects from an on-premise device for appropriately provisioning the remote platform server to execute the remote iteration of the client software application.

21 Claims, 16 Drawing Sheets

(56) References Cited

U.S. PATENT DOCUMENTS

| | | | |
|---|---|---|---|
| 2015/0356113 | A1 | 12/2015 | Suryanarayanan et al. |
| 2016/0048408 | A1 | 2/2016 | Madhu et al. |
| 2016/0119413 | A1 | 4/2016 | Antipa et al. |
| 2016/0124665 | A1 | 5/2016 | Jain et al. |
| 2016/0147857 | A1* | 5/2016 | Kramer .................. G06F 16/211 707/634 |
| 2016/0277497 | A1 | 9/2016 | Bannister et al. |
| 2016/0321287 | A1 | 11/2016 | Uthra et al. |
| 2016/0350326 | A1 | 12/2016 | Simonetti |
| 2016/0364201 | A1 | 12/2016 | Beveridge et al. |
| 2017/0017551 | A1 | 1/2017 | Nichols et al. |
| 2017/0060702 | A1 | 3/2017 | Dave et al. |
| 2017/0115980 | A1 | 4/2017 | Bagal et al. |
| 2017/0168903 | A1 | 6/2017 | Dornemann et al. |
| 2017/0264684 | A1 | 9/2017 | Spillane et al. |
| 2017/0364699 | A1 | 12/2017 | Goldfarb et al. |
| 2018/0137174 | A1 | 5/2018 | Cahana et al. |
| 2018/0300367 | A1 | 10/2018 | Yu et al. |
| 2019/0205411 | A1 | 7/2019 | Lai |
| 2019/0213265 | A1 | 7/2019 | Boerner et al. |
| 2019/0266258 | A1 | 8/2019 | Chen et al. |
| 2020/0007530 | A1 | 1/2020 | Mohamad Abdul et al. |
| 2020/0201918 | A1 | 6/2020 | Karande et al. |
| 2020/0311028 | A1 | 10/2020 | Korepanov et al. |
| 2021/0132811 | A1 | 5/2021 | Puvvada et al. |

\* cited by examiner

| 308 | 310 | 312 | 314 | 316 |
|---|---|---|---|---|
| User ID | Application ID | Remote Application Iteration ID | Environment Instance ID | On-Premise Application Information |
|  |  |  |  |  |
|  |  |  |  |  |
|  |  |  |  |  |
|  |  |  |  |  |
|  |  |  |  |  |

SYSTEMS, METHODS AND COMPUTER PROGRAM PRODUCTS FOR REMOTE DATA RETRIEVAL FROM COMPUTING DEVICES

FIELD OF THE INVENTION

The present invention relates to the domain of cloud based or remote device based computing, and more particularly to methods, systems and computer program products for enabling remote device based execution of client software application through dynamic retrieval of data objects by the remote device from a computing device/on-premise device.

BACKGROUND OF THE INVENTION

Cloud based or network based data centers for providing on-demand computing infrastructure has become widespread. Client application software that were previously executed only on computing devices within the premises of an entity or organization ("On-premise device(s)"), is now capable of being executed on remote servers or remote computing devices located at a remote facility outside the client premises (for example, within a server farm or cloud).

FIG. 1 illustrates an exemplary system environment 100 that is configured to provide a cloud based infrastructure for remote execution of client application software. System environment 100 comprises computing device 102 (or on-premise device 102), network 104 and remote server platform 106. For the purposes of the present invention the terms "computing device" and "on-premises device" may be used interchangeably, and shall be understood as referring to computing device 102/on-premise device 102 as illustrated in FIG. 1.

Computing device 102 may comprise any server 102a and/or other computing device 102b having a client application software installed thereon, and having a corresponding application environment implemented thereon. The application environment corresponding to the client application software comprises a plurality of data objects (e.g. software data files) stored within a file system associated with computing device 102—the one or more data objects comprising (i) application software data objects—comprising data objects that include application software code, application software libraries and/or application software data files, and/or (ii) user generated data objects-comprising user specific data or user generated data associated with operations of the application software code.

Network 104 may comprise any data network that enables data communication between entities connected to the network—and may in various non-limiting embodiments include any of a local area network, wide area network, distributed data network, or internetwork such as the Internet.

Remote server platform 106 comprises a remote server 106a and a memory or database 106b communicatively coupled thereto. Remote server 106a is configured to instantiate and run within remote server platform 106, a remote iteration (i.e. remote instance) of the client application software that is installed on computing device 102. For the purposes of instantiating and executing the remote iteration of the client application software, remote server platform 106 would have installed thereon, an iteration of executable application software code corresponding to the client application software. Additionally however, remote server 106a requires access to an application environment (within remote server platform 106), corresponding to the remote iteration of the client application software that is installed within remote server platform 106. The application environment within remote server platform 106 provides the remote iteration of the client application software with access to application software data objects and user generated data objects necessary for execution of the remote iteration of the client application software.

It would be understood that the application environment within remote server platform 106 requires to have stored therewithin, application software data objects and user generated data objects that are consistent with a corresponding application environment that is stored at computing device 102. Failure to ensure that the application environment within the remote server has access to all necessary data objects from an application environment within computing device 102 results in either (i) failure or error in execution of the remote iteration of the client application software, or (ii) data outputs from the remote iteration of the client application software that are inconsistent with data outputs that would have been generated by a corresponding execution of the client application software within computing device 102.

Existing solutions to enable cloud based execution of client application software resolve this problem by cloning or reproducing the entire application environment from computing device 102, at remote server platform 106, prior to executing the remote iteration of the client application software. This approach has been found to have several drawbacks.

The first serious drawback is that reproducing the entire application environment at remote server platform 106 is data and time intensive. Depending on network bandwidth and network latency, the process of provisioning the necessary application environment within remote server platform 106 can involve significant amounts of time, and a large network overhead-arising from the need to reproduce all data objects within the application environment, regardless of whether they are actually required for the remote application iteration that is being executed at remote server platform 106.

Additionally, a user may want to run multiple remote iterations of the client application software within remote server platform 106—in which case, each remote iteration of the client application software will require to generate and provision a corresponding instance of the application environment at remote server platform 106. This exponentially increases the overhead and latency concerns—and in certain cases may place undesirable or unserviceable loads upon computing device 102. At the same time, generating a single common instance of the application environment at remote server platform 106 for use by all remote application iterations of the client application software is not feasible, as each remote application iteration of the client application software requires to independently operate on and effect state changes within the corresponding application environment—and changes made by a first remote application iteration of the client application software may interfere with the desired operation of a second remote application iteration of the client application software.

There is accordingly a need for a secure, effective and computationally efficient solution for executing remote application iteration(s) of client application software on a remote server platform, and for enabling each remote application iteration of a client application software to have access to a corresponding instance of an application software environment that has access to all necessary data objects required for execution of that remote application iteration.

SUMMARY

The invention provides systems, methods and computer program products for executing remote application iteration(s) of client application software on a remote server platform, and for enabling each remote application iteration of a client application software to have access to a corresponding instance of an application software environment that has access to all data objects necessary for execution of such remote application iteration. The invention additionally enables execution of a remote application iteration of a client software application at a remote server platform, through need-based or dynamic retrieval of data objects from an on-premise device for appropriately provisioning the remote platform server to execute the remote iteration of the client software application.

The invention provides a method for execution of an application software iteration at a remote server through network based access to a computing device, the method comprises (i) instantiating at the remote server (a) a remote application iteration of a client application software, wherein said client application software has a corresponding local instance of an application environment stored on the computing device, and (b) a remote application environment instance that is configured to permit access by the remote application iteration, wherein the remote application environment instance does not include all data objects stored within the local instance of an application environment stored on the computing device, (ii) executing at the remote server, application software code corresponding to the remote application iteration, (iii) identifying at least one data object required by the application software code, (iv) responsive to determining that the identified at least one data object is not available within the remote application environment instance, initiating obtaining of the identified at least one data object from the local instance of an application environment stored on the computing device, wherein the obtaining of the identified at least one data object comprises (c) transmitting to the computing device, a request for the identified at least one data object, the request comprising file path data identifying a file path, wherein the file path identifies a location of the at least one data object within a file system of the computing device, (d) obtaining from the computing device, computing device metadata comprising (1) first directory metadata corresponding to a first file system directory within which the at least one data object is stored on the computing device, and (2) second directory metadata comprising metadata corresponding to at least a second file system directory identified within the file path, wherein the second file system directory is distinct from the first file system directory, (v) obtaining the identified at least one data object from the first file system directory, (vi) storing the computing device metadata and the at least one data object in a memory accessible by the remote server, and (vii) executing the application software code at the remote server based on the identified at least one data object.

In an embodiment of the method, the second directory metadata comprises metadata corresponding to each file system directory identified within the file path, other than the first file system directory.

In another embodiment of the method (i) the first directory metadata describes file contents within the first file system directory, and (ii) the second directory metadata describes file contents within at least the second file system directory.

In a specific embodiment of the method (i) the first directory metadata comprises data that describes attributes of one or more data files, data records, directories, folders or file paths within the first file system directory, and (ii) the second directory metadata comprises data that describes attributes of one or more data files, data records, directories, folders or file paths within at least the second file system directory.

In a particular method embodiment, the remote server (i) generates or modifies a metadata image based on the received computing device metadata, and (ii) stores the metadata image in a memory accessible by the remote server, wherein the memory is associated with one or both of the remote application environment instance and a user of the remote application environment instance.

In a more particular method embodiment, the remote server stores the received at least one data object in a memory that is configured to permit access by (i) only the remote application iteration, or (ii) a plurality of application software iterations of one or more application softwares that are associated with the user of the remote application environment instance.

In another method embodiment, obtaining the identified at least one data object from the local instance of an application environment stored on the computing device comprises (i) parsing the stored metadata image for metadata corresponding to the identified at least one data object, and (ii) responsive to retrieval of metadata corresponding to the identified at least one data object from the metadata image, transmitting to the computing device, a data object retrieval request message that includes all or some of the metadata retrieved from the metadata image.

In an embodiment of the method, the identified at least one data object that is subsequently received from the computing device in response to the transmitted data object retrieval request message, is retrieved from the computing device based on the metadata included within the data object retrieval request message.

In another method embodiment (i) the request for the identified at least one data object is transmitted from the remote server to a processor implemented software agent that is associated with the remote application iteration or with a user of the remote application iteration, (ii) the computing device is configured such that the processor implemented software agent is provided with access to the file system of the computing device, and (iii) the processor implemented software agent's access to the file system of the computing device is restricted to one or both of read access and write access to only such data objects that, the remote application iteration or the user of the remote application iteration, is authorized to access.

In a particular method embodiment one or more of the steps of obtaining the computing device metadata from the computing device, obtaining the identified at least one data object from the first file system directory, and receiving the computing device metadata and the at least one data object in a memory accessible by the remote server, are implemented through the processor implemented software agent.

The invention additionally provides a system for execution of an application software iteration at a remote server through network based access to an on-premise device. The system comprises a remote server configured for (i) instantiating (a) a remote application iteration of a client application software, wherein the client application software has a corresponding local instance of an application environment stored on the computing device, and (b) a remote application environment instance that is configured to permit access by the remote application iteration, wherein the remote application environment instance does not include all data objects stored within the local instance of an application environment stored on the computing device, (ii) executing at the remote server, application software code corresponding to the remote application iteration, (iii) identifying at least one data object required by the application software code, (iv) responsive to determining that the identified at least one data object is not available within the remote application environment instance, initiating obtaining of the identified at least one data object from the local instance of an application environment stored on the computing device, wherein the obtaining of the identified at least one data object comprises (c) transmitting to the computing device, a request for the identified at least one data object, the request comprising file path data identifying a file path, wherein the file path identifies a location of the at least one data object within a file system of the computing device, (d) obtaining from the computing device, computing device metadata comprising (1) first directory metadata corresponding to a first file system directory within which the at least one data object is stored on the computing device, and (2) second directory metadata comprising metadata corresponding to at least a second file system directory identified within the file path, wherein the second file system directory is distinct from the first file system directory, (v) obtaining the identified at least one data object from the first file system directory, (vi) storing the computing device metadata and the at least one data object in a memory accessible by the remote server, and (vii) executing the application software code at the remote server based on the identified at least one data object.

In an embodiment of the system, the second directory metadata comprises metadata corresponding to each file system directory identified within the file path, other than the first file system directory.

In another embodiment of the system (i) the first directory metadata describes file contents within the first file system directory, and (ii) the second directory metadata describes file contents within at least the second file system directory.

In an embodiment, the system is configured such that (i) the first directory metadata comprises data that describes attributes of one or more data files, data records, directories, folders or file paths within the first file system directory, and (ii) the second directory metadata comprises data that describes attributes of one or more data files, data records, directories, folders or file paths within at least the second file system directory.

In a further system embodiment, the remote server is configured to (i) generate or modify a metadata image based on the received computing device metadata, and (ii) store the metadata image in a memory accessible by the remote server, wherein the memory is associated with one or both of the remote application environment instance and a user of the remote application environment instance.

In a specific embodiment of the system, the remote server is configured to store the received at least one data object in a memory that is configured to permit access by (i) only the remote application iteration, or (ii) a plurality of application software iterations of one or more application softwares that are associated with the user of the remote application environment instance.

In a particular embodiment of the system, obtaining the identified at least one data object from the local instance of an application environment stored on the computing device comprises (i) parsing the stored metadata image for metadata corresponding to the identified at least one data object, and (ii) responsive to retrieval of metadata corresponding to the identified at least one data object from the metadata image, transmitting to the computing device, a data object retrieval request message that includes all or some of the metadata retrieved from the metadata image.

In a more specific embodiment of the system, the identified at least one data object that is subsequently received from the computing device in response to the transmitted data object retrieval request message, is retrieved from the computing device based on the metadata included within the data object retrieval request message.

In one system embodiment (i) the request for the identified at least one data object is transmitted from the remote server to a processor implemented software agent that is associated with the remote application iteration or with a user of the remote application iteration, (ii) the computing device is configured such that the processor implemented software agent is provided with access to the file system of the computing device, and (iii) the processor implemented software agent's access to the file system of the computing device is restricted to one or both of read access and write access to only such data objects that, the remote application iteration or the user of the remote application iteration, is authorized to access.

In an embodiment, the system is configured such that one or more of the steps of obtaining the computing device metadata from the computing device, obtaining the identified at least one data object from the first file system directory, and receiving the computing device metadata and the at least one data object in a memory accessible by the remote server, are implemented through the processor implemented software agent.

The invention additionally provides a computer program product for execution of an application software iteration at a remote server through network based access to an on-premise device. The computer program product comprises a non-transitory computer usable medium having a computer readable program code embodied therein, the computer readable program code comprising instructions for implementing within a processor based computing system, the steps of (i) instantiating at the remote server (a) a remote application iteration of a client application software, wherein the client application software has a corresponding local instance of an application environment stored on the computing device, and (b) a remote application environment instance that is configured to permit access by the remote application iteration, wherein the remote application environment instance does not include all data objects stored within the local instance of an application environment stored on the computing device, (ii) executing at the remote server, application software code corresponding to the remote application iteration, (iii) identifying at least one data object required by the application software code, (iv) responsive to determining that the identified at least one data object is not available within the remote application environment instance, initiating obtaining of the identified at least one data object from the local instance of an application environment stored on the computing device, wherein the obtaining of the identified at least one data object comprises (c) transmitting to the computing device, a request for the identified at least one data object, the request comprising file path data identifying a file path, wherein the file path identifies a location of the at least one data object within a file system of the computing device, (d) obtaining from the computing device, computing device metadata comprising (1) first directory metadata corresponding to a first file system directory within which the at least one data object is stored on the computing device, and (2) second directory metadata comprising metadata corresponding to at least a second file system directory identified within the file path, wherein the second file system directory is distinct from the first file system directory, (v) obtaining the identified at least one data object from the first file system directory, (vi) storing the computing device metadata and the at least one data object in a memory accessible by the remote server, and (vii) executing the application software code at the remote server based on the identified at least one data object.

BRIEF DESCRIPTION OF THE ACCOMPANYING DRAWINGS

Figure 3A:
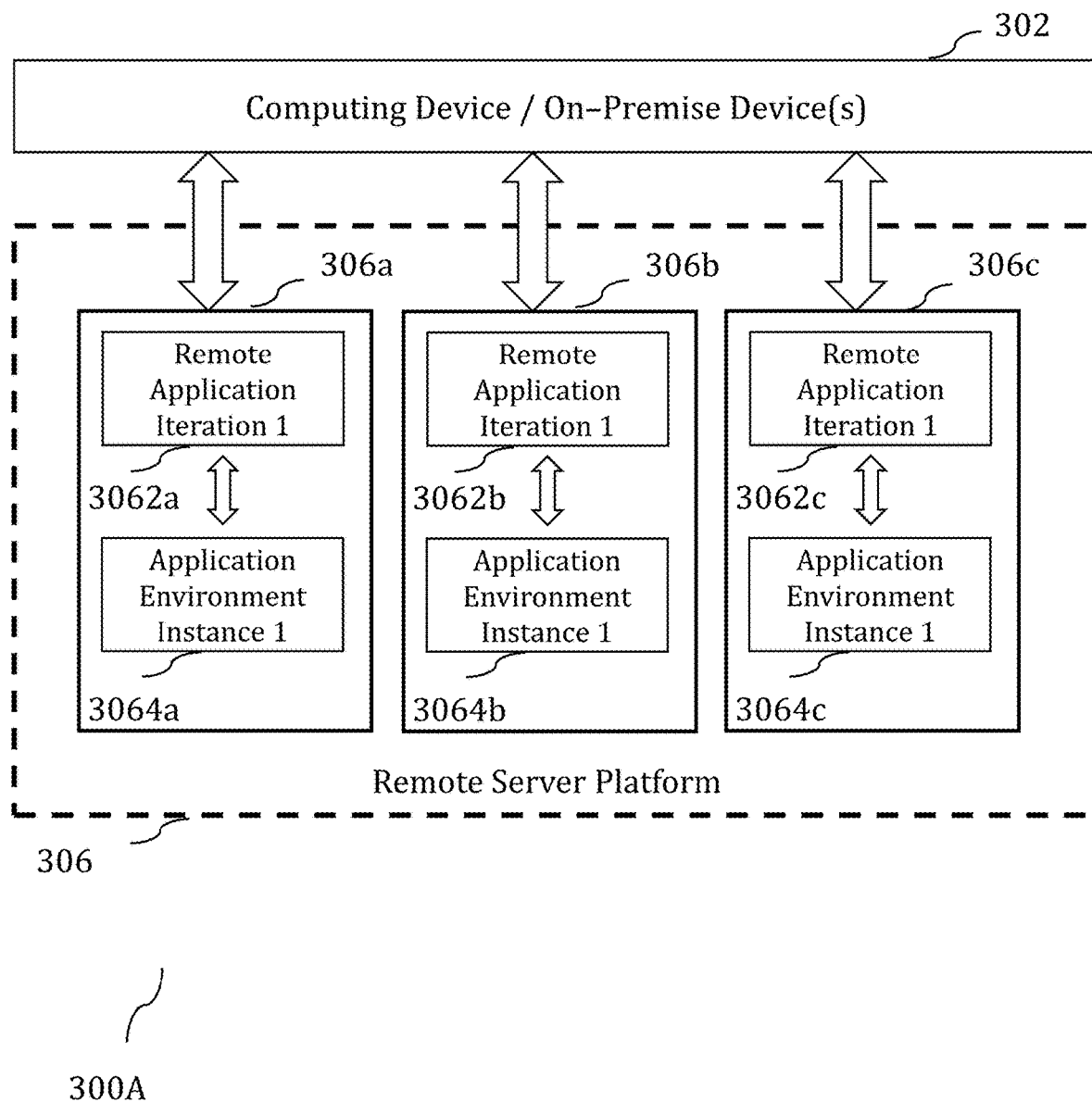
Figure 13:
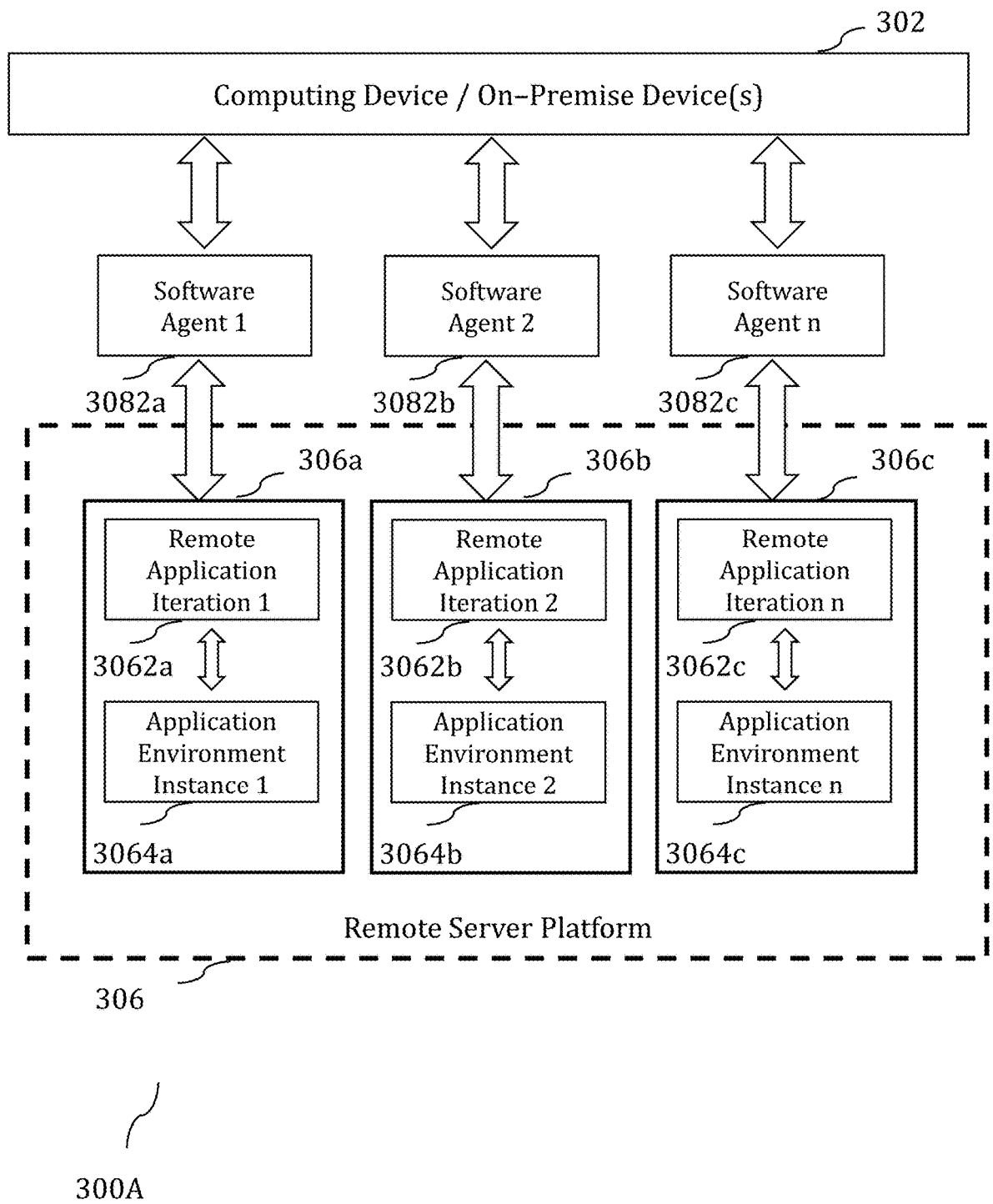

FIGS. 3A and 13 respectively illustrate embodiments of a system environment configured in accordance with the teachings of the present invention for execution of a plurality of remote application iterations of a client application software.

FIG. 3B illustrates an exemplary data structure configured for enabling remote execution of client application software in accordance with the teachings of the present invention.

Figure 4:
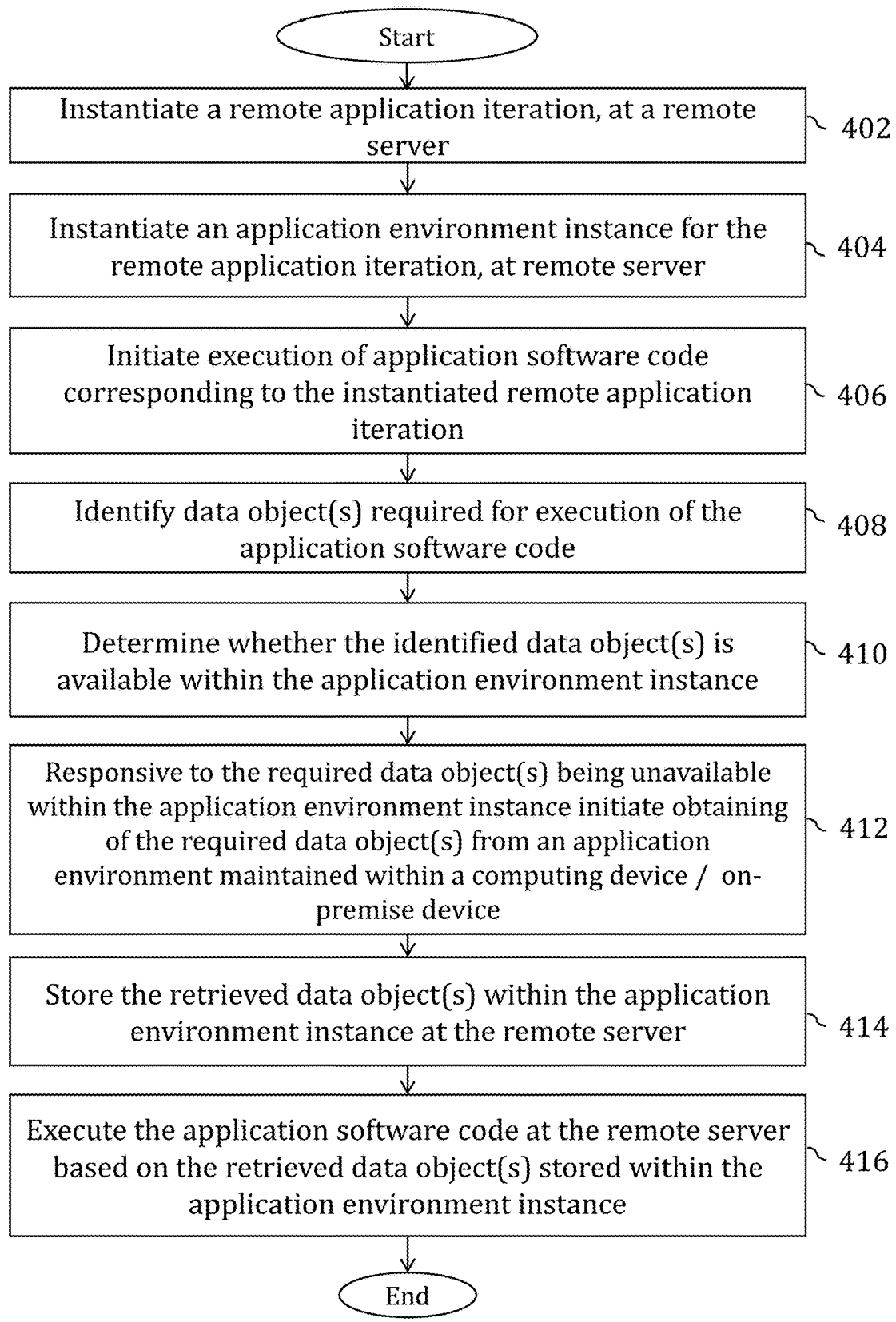

FIG. 4 is a flowchart illustrating a method of executing a remote application iteration of a client software application at a remote server platform based on dynamic retrieval of data from an on-premise device.

Figure 5:
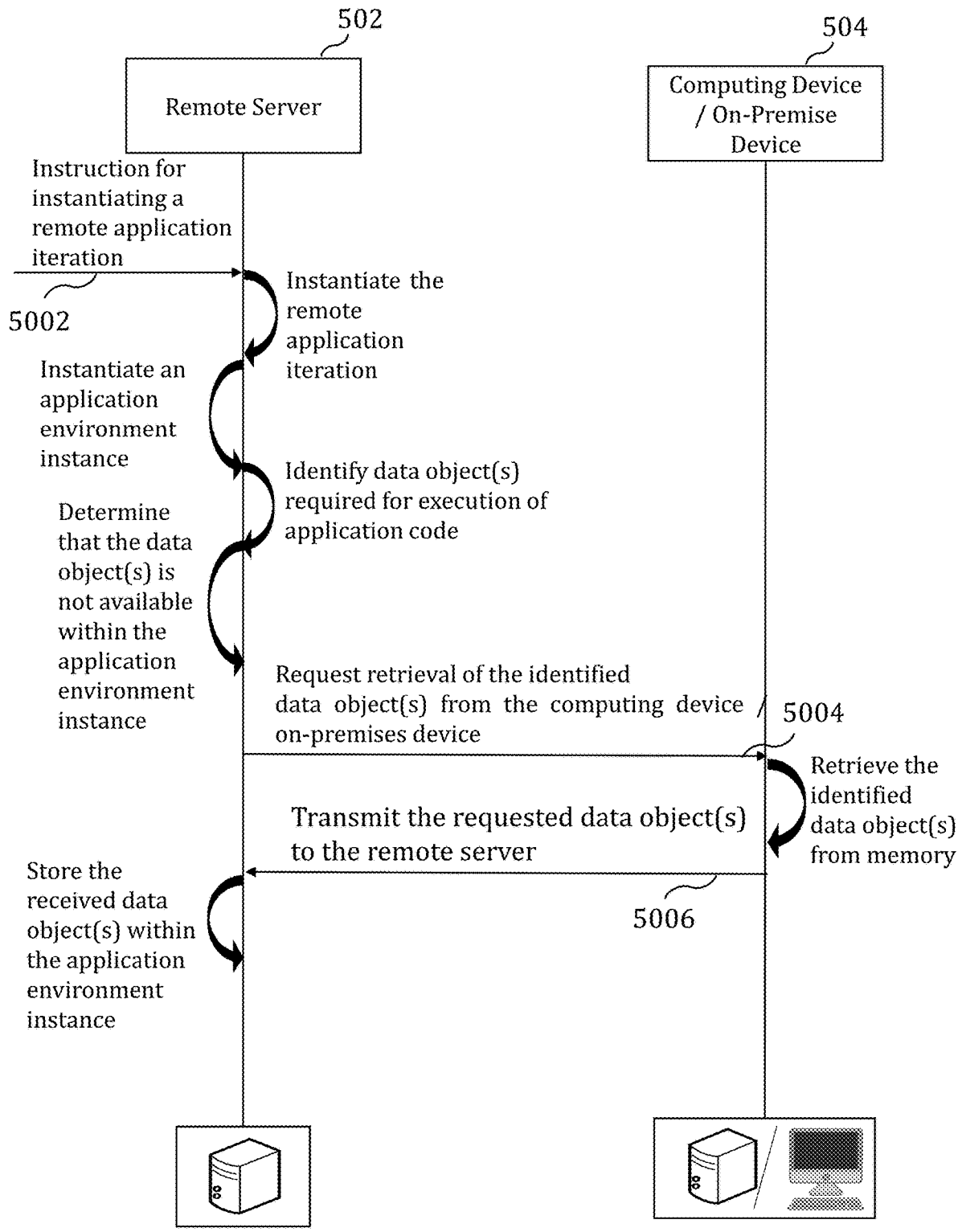

FIG. 5 is a communication flow diagram illustrating communication flow between system entities involved in implementing the method of FIG. 4.

Figure 6:
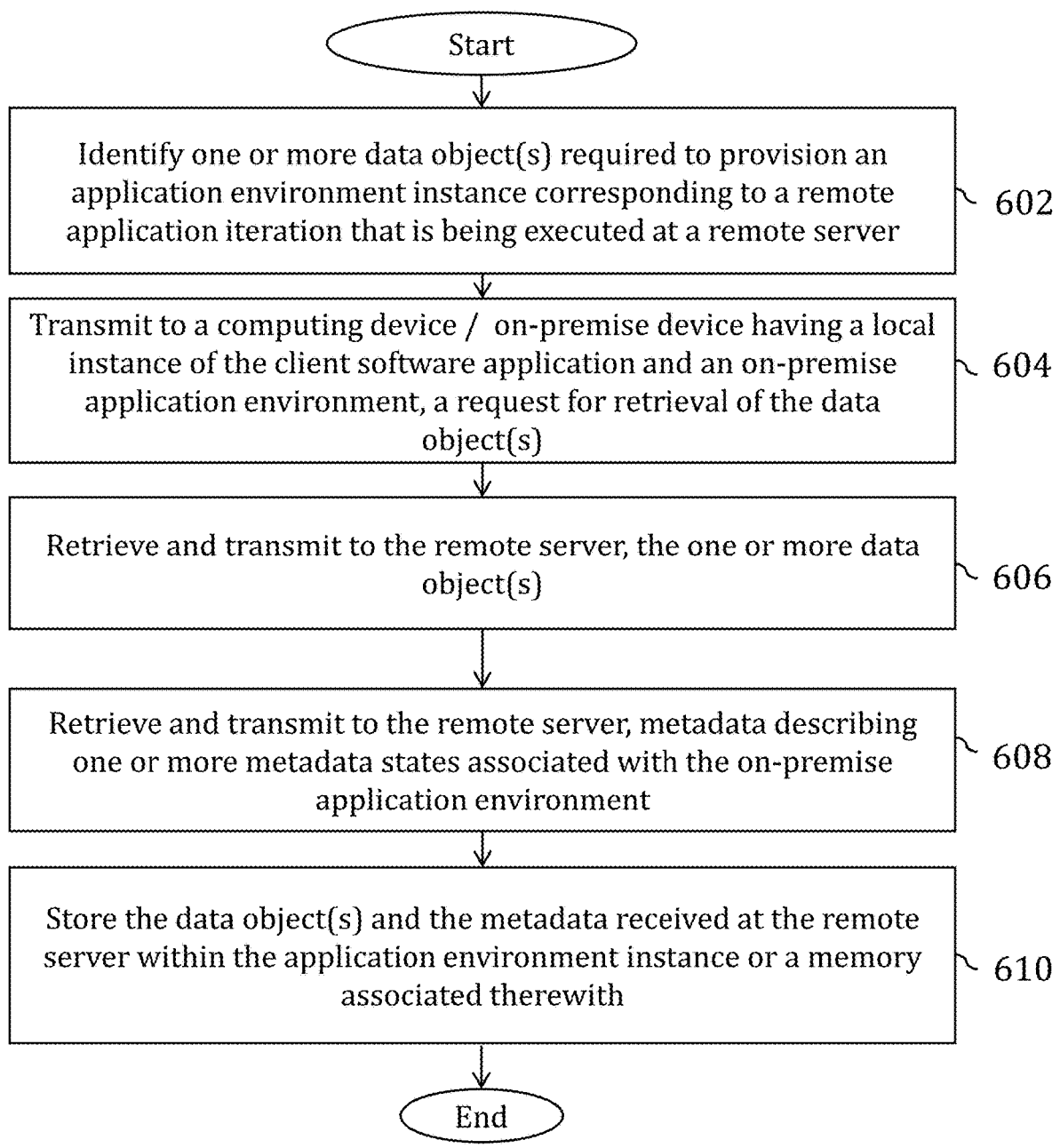

FIG. 6 is a flowchart illustrating a method for dynamic retrieval of data from an on-premise device for provisioning an instance of a client software application environment maintained at a remote server platform.

Figure 7:
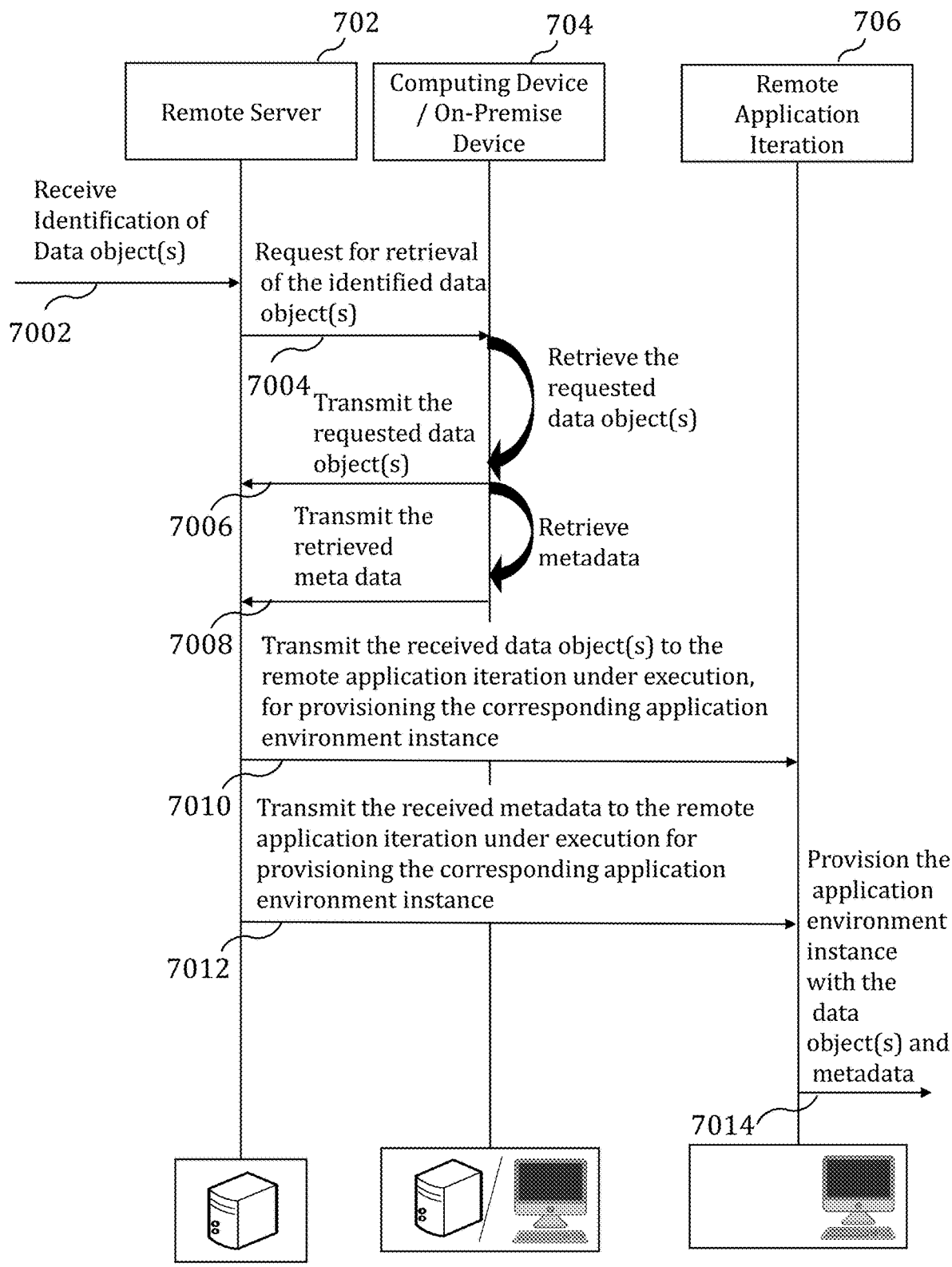

FIG. 7 is a communication flow diagram illustrating communication flow between system entities involved in implementing the method of FIG. 6.

Figure 8:
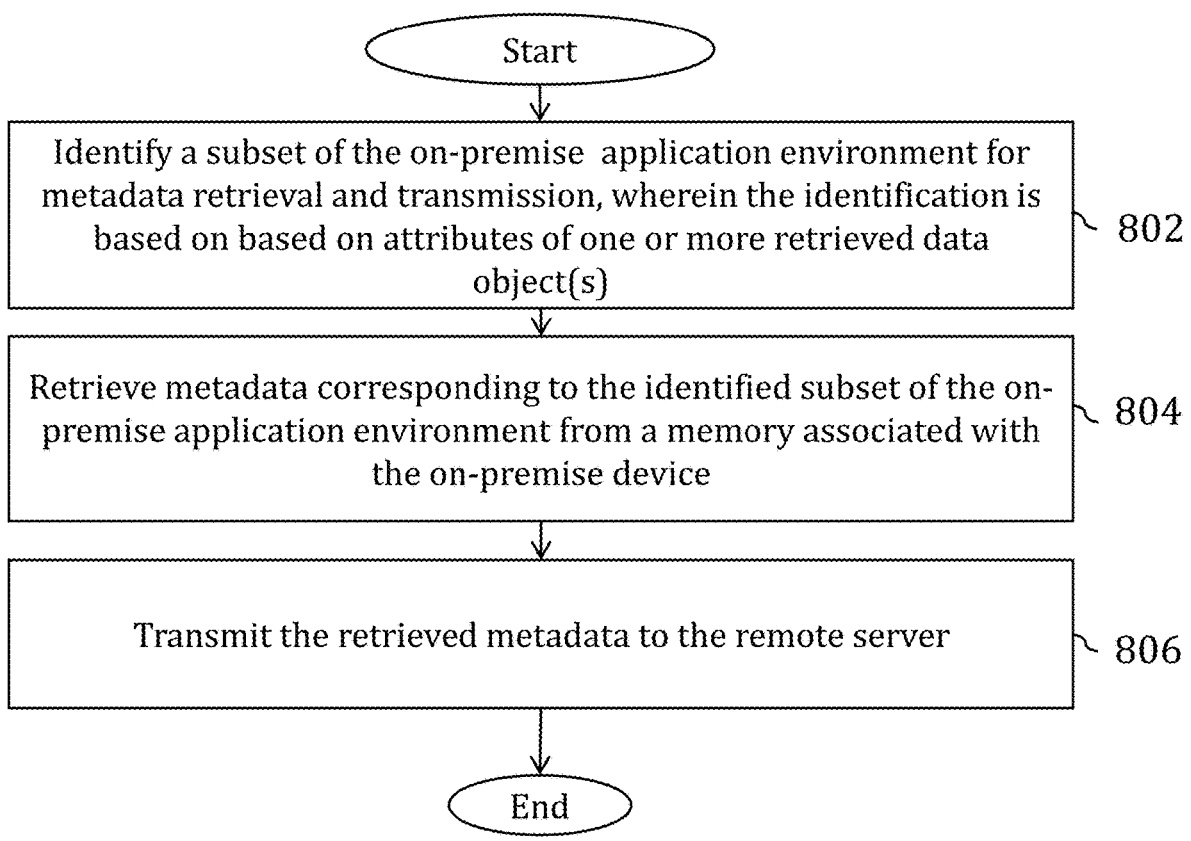

FIG. 8 is a flowchart illustrating a method for identifying metadata and retrieving metadata from an on-premise device for provisioning an instance of a client software application environment maintained at a remote server platform.

Figure 9:
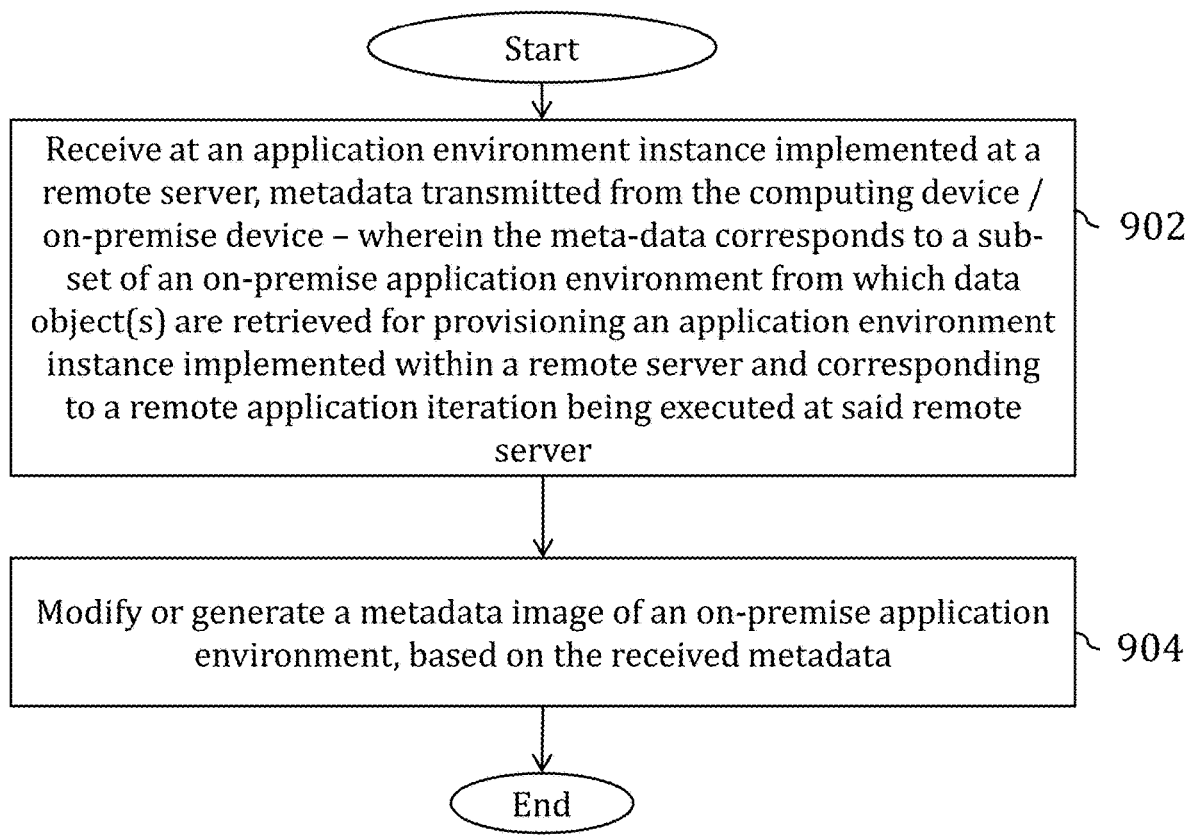

FIG. 9 is a flowchart illustrating a method for generating a metadata image of an on-premise application environment, for provisioning an instance of a client software application environment maintained at a remote server platform.

Figure 10:
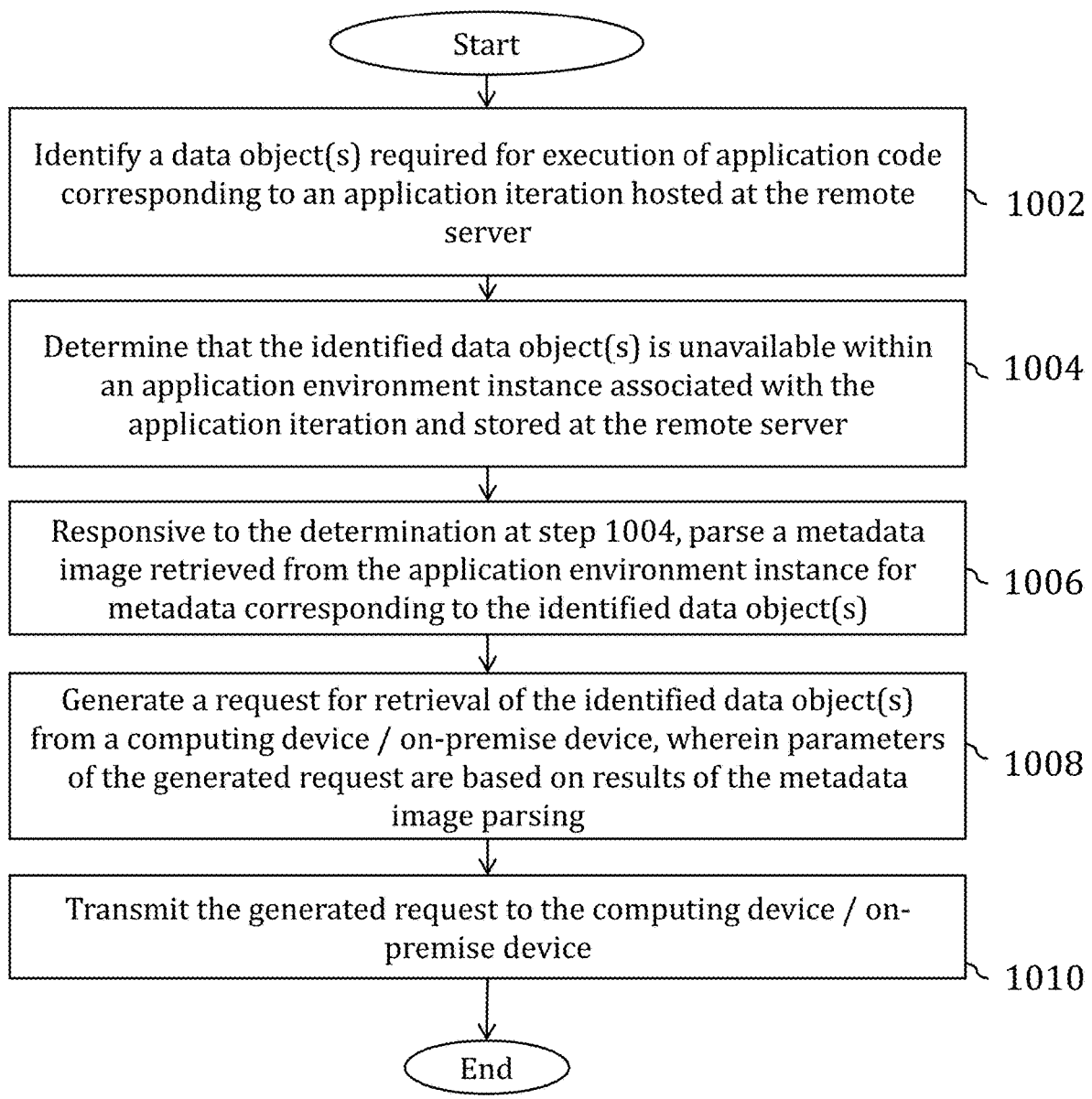
Figure 11:
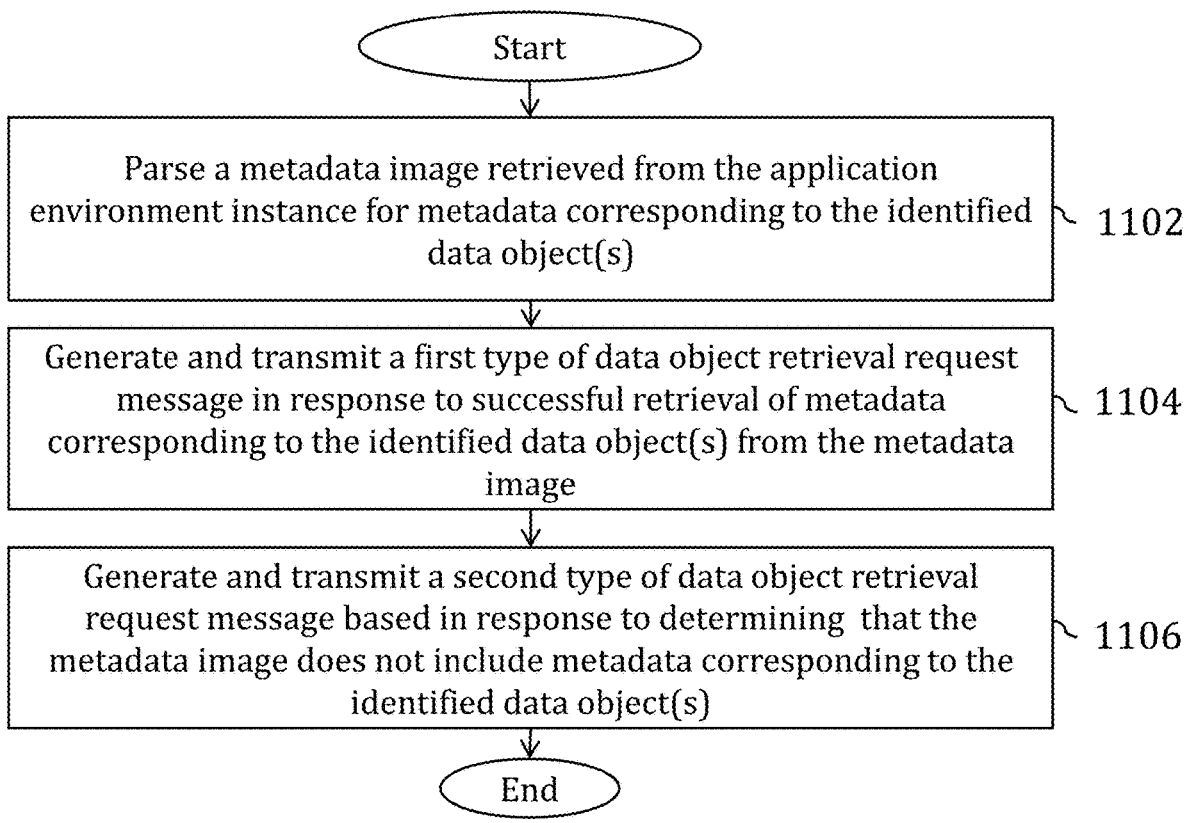

FIG. 10 is a flowchart illustrating a method for requesting from an on-premise device, retrieval of one or more data objects associated with an iteration of a client application software that is being executed at a remote server platform FIG. 11 is a flowchart illustrating a specific method of generating a data object retrieval request for provisioning an instance of a client software application that is being executed at a remote server.

Figure 12:
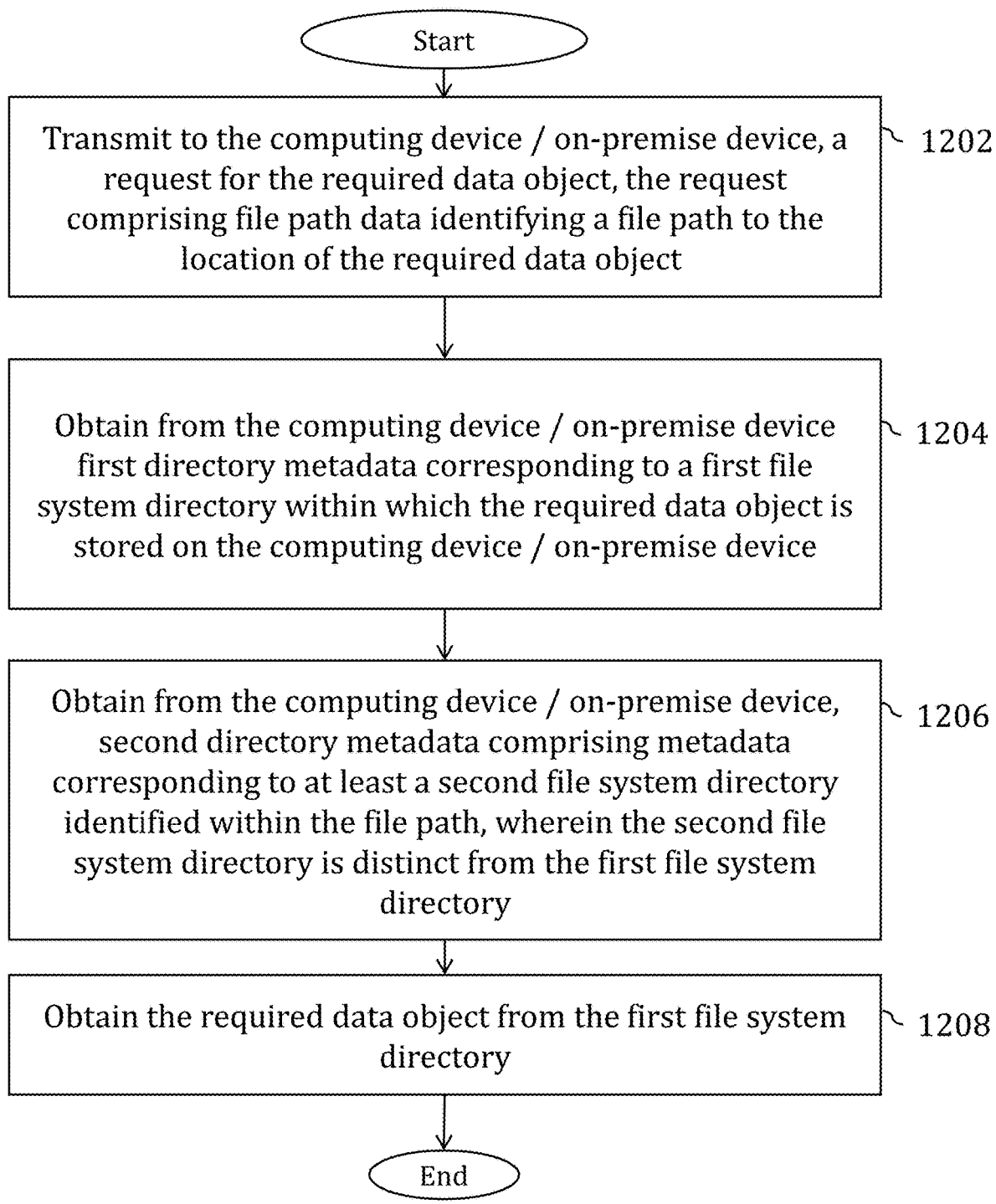

FIG. 12 is a flowchart illustrating method steps that are implemented pursuant to the method of FIG. 4.

Figure 14:
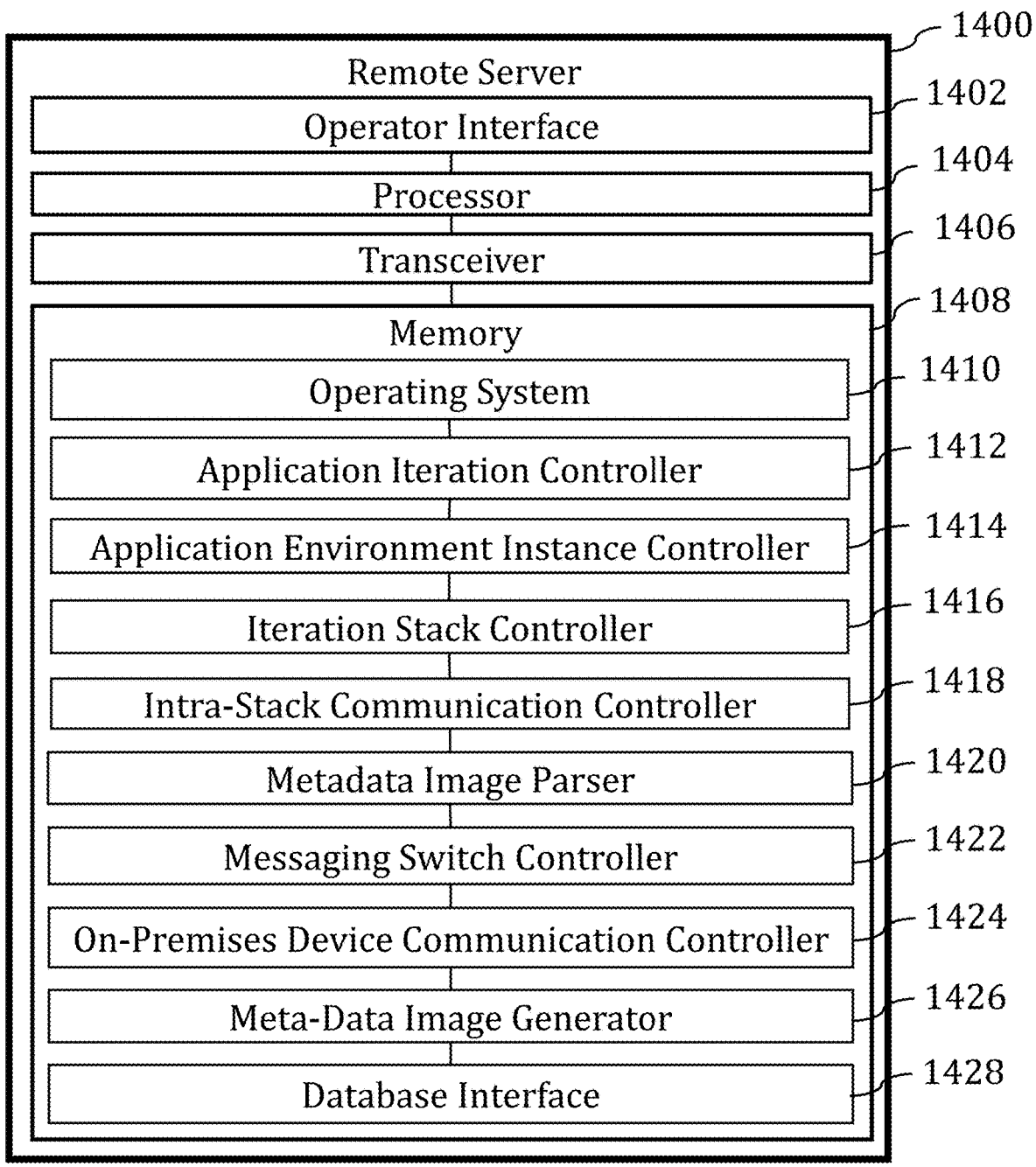

FIG. 14 illustrates an exemplary remote server configured to implement the methods of the present invention.

Figure 15:
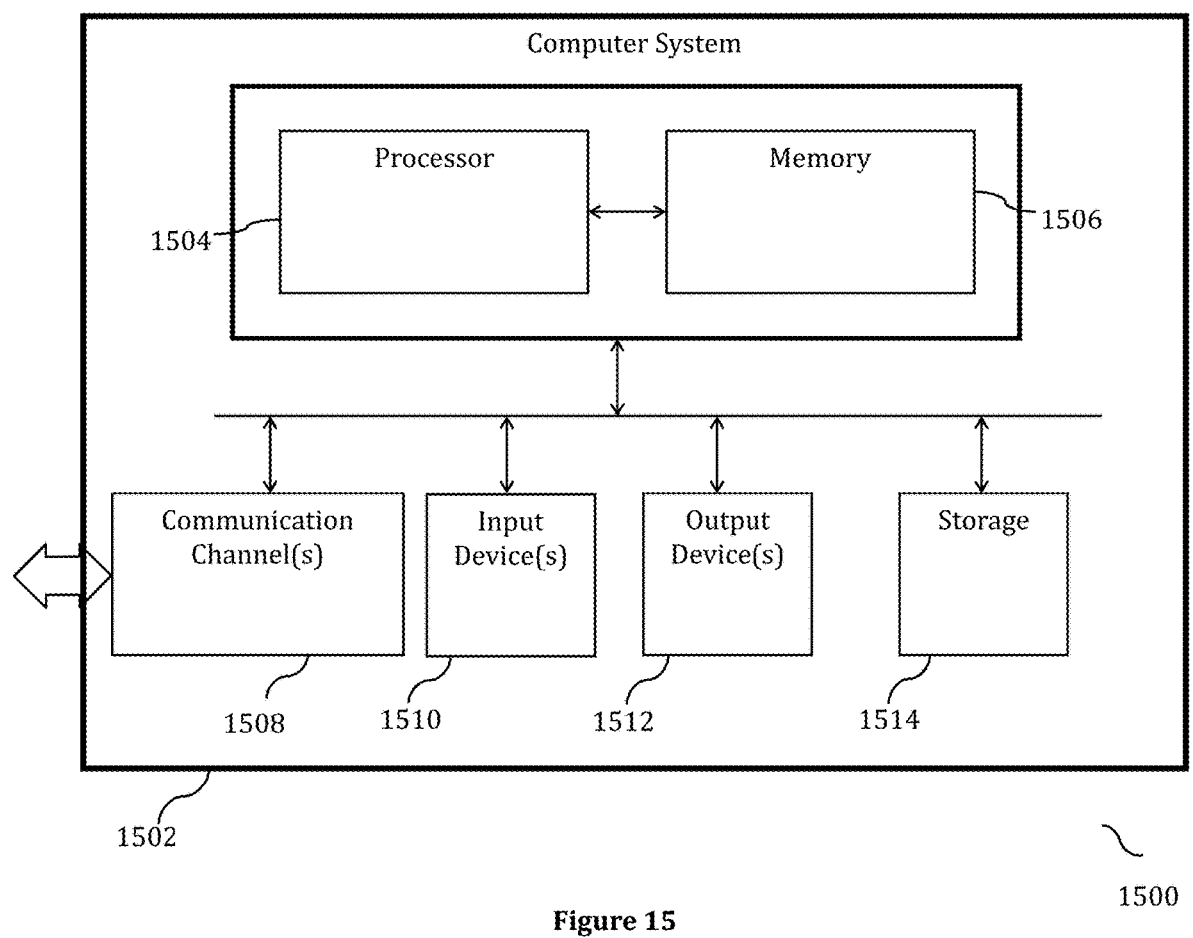

FIG. 15 illustrates an exemplary computer system according to which various embodiments of the present invention may be implemented.

DETAILED DESCRIPTION

The invention provides systems, methods and computer program products for executing remote application iteration(s) of client application software on a remote server platform, and for enabling each remote application iteration of a client application software to have access to a corresponding instance of an application software environment that contains or otherwise has access to data object(s) necessary for execution of the remote application iteration. The invention additionally enables execution of a remote application iteration of a client software application at a remote server platform, through need-based or dynamic retrieval of data objects from a computing device/on-premise device for provisioning (on the remote platform server) an instance of the client software application environment required for execution of the remote application iteration of the client software application.

Figure 1:
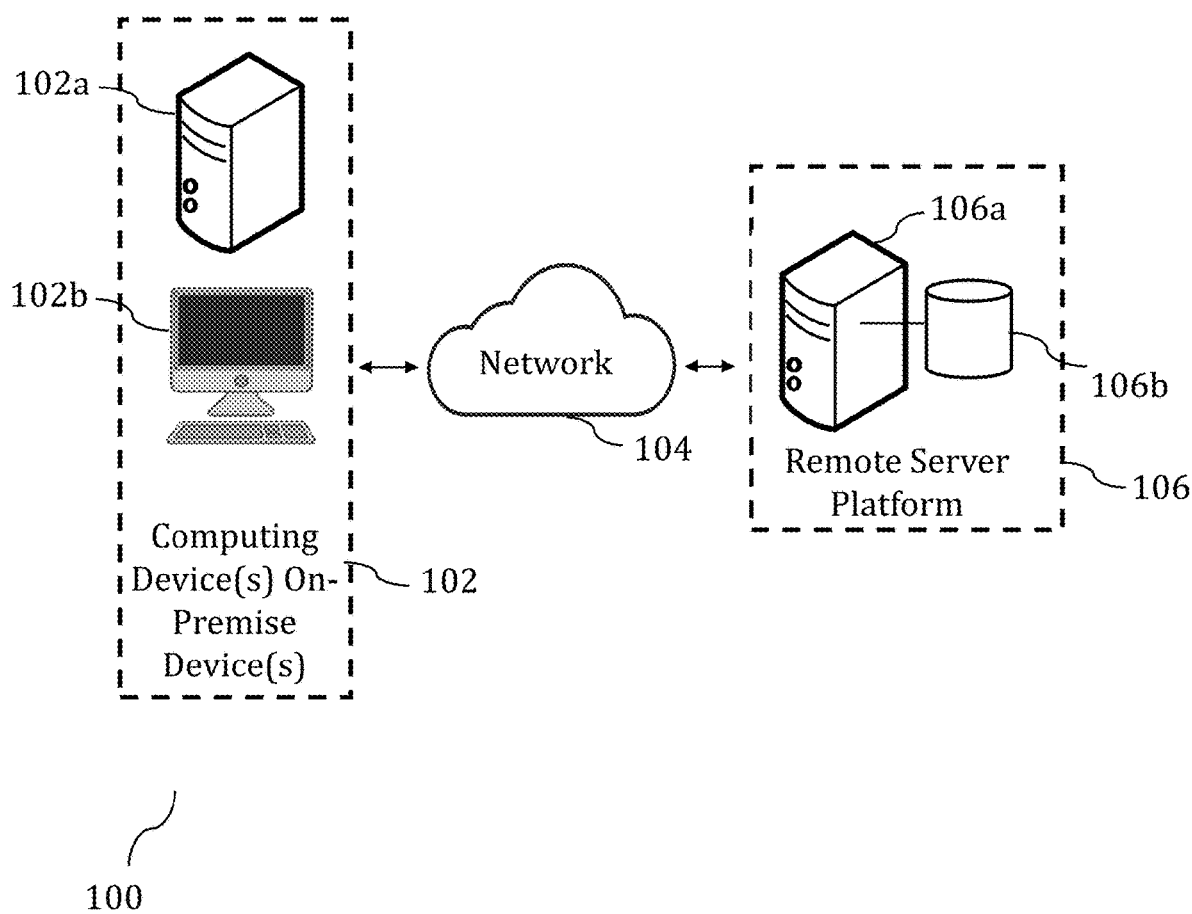
FIG. 1 illustrates a system environment that is configured to provide a cloud based infrastructure for remote execution of client application software.
Figure 2:
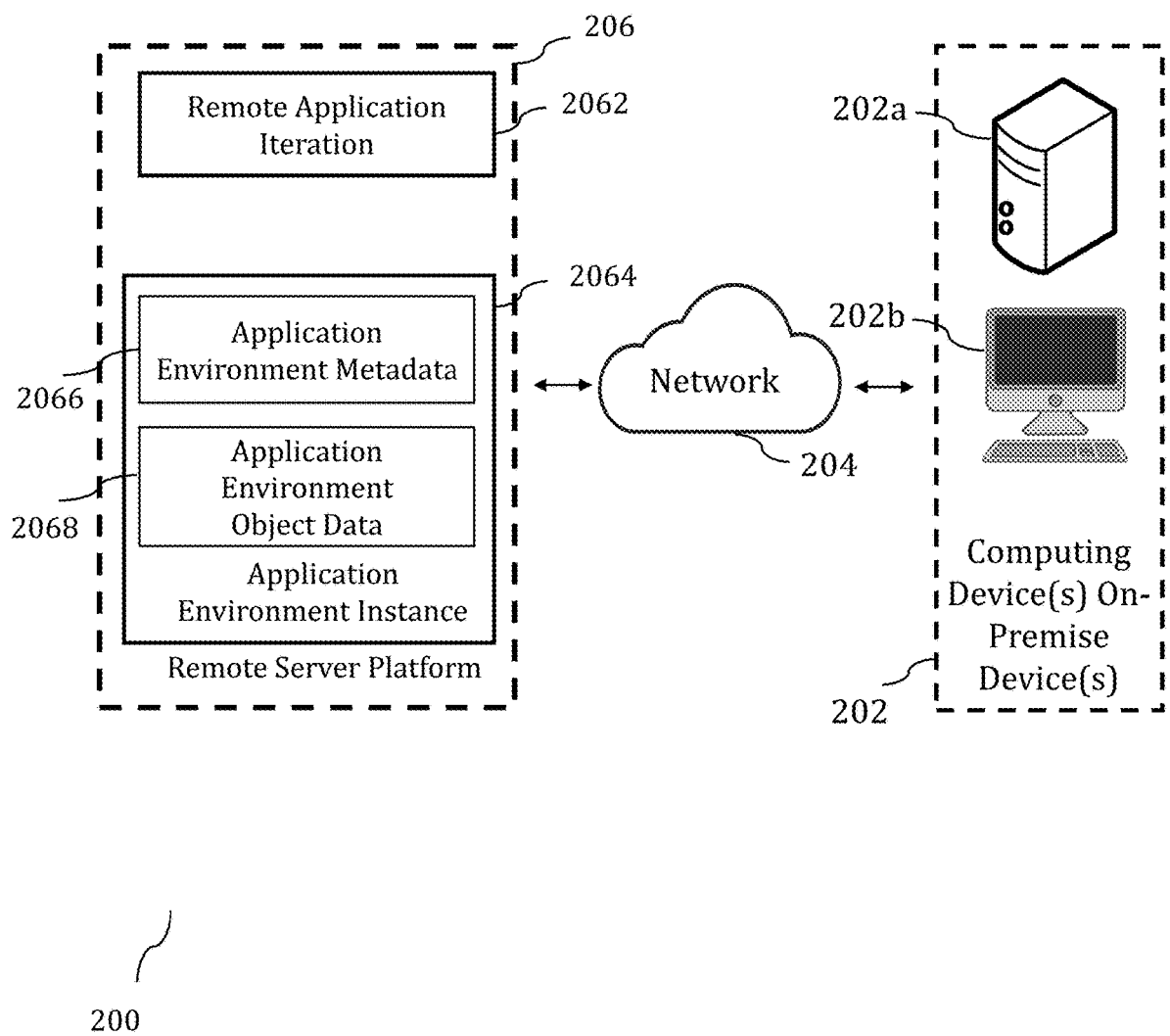
FIG. 2 illustrates an embodiment of a system environment configured in accordance with the teachings of the present invention for remote execution of client application software.

FIG. 2 illustrates an embodiment of a system environment 200 configured in accordance with the teachings of the present invention for remote execution of client application software.

System environment 200 comprises computing device/on-premise device 202, network 204 and remote server platform 206.

Computing device 202 may comprise any server 202a and/or other data processing device 202b having a client application software installed thereon, and having a corresponding application environment implemented thereon. The application environment corresponding to the client application software comprises a plurality of data objects (e.g. software data files) stored within a file system associated with computing device 202—the one or more data objects comprising (i) application software data objects-comprising data objects that include application software code, and application software attribute data and/or (ii) user generated data objects-comprising user data associated with operations of the application software code.

Network 204 may comprise any data network that enables data communication between entities connected to the network- and may in various non-limiting embodiments include any of a local area network, wide area network, distributed data network, or internetwork such as the Internet.

Remote server platform 206 comprises at least one remote application iteration 2062 implemented on a remote server or a processor within remote server platform 206. Remote application iteration 2062 is a remote instance of a client application software that is installed on computing device 202, which remote instance is being executed within remote server platform 206.

Remote server platform 206 additionally comprises an application environment instance 2064 that is generated or implemented within remote server platform 206—and more particularly within a memory within or coupled with remote server platform 206. Application environment instance 2064 is a local instance of an application environment corresponding to the remote application iteration of the client application software that is installed or running within remote server platform 206. This application environment instance 2064 within remote server platform 206 provides remote application iteration 2062 of the client application software, with access to application software data objects and user generated data objects that are required for execution of the remote application iteration 2062 at remote server platform 206.

As shown in FIG. 2, application environment instance 2064 comprises application environment metadata 2066 and application environment object data 2068. The application environment metadata 2066 and application environment object data 2068 provide remote application iteration 2062 with access to application software data objects and user generated data objects that are required for execution of the remote application iteration 2062 at remote server platform 206. It would be understood that application software data objects may comprise data objects that include application software code, application software libraries and application software data files, while user generated data objects may comprise user specific data or user generated data associated with operations of the application software code.

Application environment object data 2068 may include any one or more of data files or data records stored within a file system, one or more directories, folders or file paths within the file system, and one or more directories, folders or file paths that include any of nested data files, nested data records, nested directories or nested folders.

Application environment metadata 2066 comprises one or more data items, data elements or data records that describes attributes of a data file, data record, directory, folder, or file path within a file system. The attributes described by application environment metadata 2066 may include without limitation, one or more of file size, file location, owner and type of the file, file access permissions (e.g. read, write, execute), owner and type of the directory, file contents within a directory, date of file creation, date of last file modification, date of directory creation, date of last directory modification etc.

During execution of remote application iteration 2062 within remote server platform 206, the remote application iteration 2062 retrieves and relies on application environment object data 2068 and application environment metadata 2066 within application environment instance 2064. The application environment metadata 2066 and application environment object data 2068 is retrieved from computing device/on-premise device 202 through network 204 and is stored within remote server platform 206 (according to embodiments of the invention that are described in more detail below), for enabling execution of remote application iteration 2062. In particular embodiments, retrieval of application environment metadata 2066 and application environment object data 2068 from on-premise device 202 is controlled or implemented by remote application iteration 2062—which may be configured for network based communication with, and data retrieval from, on-premise device 202.

In certain embodiments of the present invention, remote server platform 206 enables execution of a plurality of remote application iterations corresponding to a client software application, on one or more remote servers or processors within remote server platform 206. FIG. 3A illustrates an embodiment of a system environment 300A configured in accordance with the teachings of the present invention for remote execution of a plurality of remote application iterations corresponding to a client application software.

System environment 300A comprises computing device/on-premise device 302, and remote server platform 306 that are communicatively coupled with each other through one or more communication networks (not shown in the Figure).

As in the case of system environment 200, computing device/on-premise device 302 within system environment 300A may comprise any server and/or other computing device having a client application software installed thereon, and having a corresponding application environment implemented thereon.

In the embodiment of FIG. 3A, remote server platform 306 is configured to remotely execute n remote iterations of a client software application—wherein each remotely executed iteration within remote server platform 306 comprises an implementation of a remote application iteration and a corresponding application environment instance. In system environment 300A, a first remote iteration 306a of the client software application comprises remote application iteration 1 (3062a) and a corresponding application environment instance 1 (3064a), a second remote iteration 306b of the client software application comprises remote application iteration 2 (3062b) and a corresponding application environment instance 2 (3064b), upto an $n^{th}$ remote iteration 306c of the client software application which comprises remote application iteration n (3062c) and a corresponding application environment instance n (3064c).

As discussed above in connection with FIG. 2, each remote application iteration 3062a, 3062b and 3062c is a remote executed instance of a client application software that is installed on computing device/on-premise device 302 that is being executed within remote platform server 306.

Additionally, each of remote application iterations 1 to n (3062a, 3062b and 3062c) has a corresponding application environment instance 1 to n (3064a, 3064b, 3064c) that is generated for and coupled with the remote application iteration. The application environment instances 1 to n (3064a, 3064b, 3064c) are stored within a memory within or coupled with remote server platform 306. Each application environment instance 1 to n (3064a, 3064b, 3064c) provides its respective remote application iteration 1 to n (3062a, 3062b, 3062c) of the client application software, with access to application software data objects and user generated data objects that are required for execution of the remote application iterations 1 to n (3062a, 3062b, 3062c) at remote server platform 306.

While not specifically illustrated in FIG. 3A, each application environment instance 1 to n (3064a, 3064b, 3064c) comprises application environment metadata and application environment object data of the type described above in connection with FIG. 2.

During execution of each remote application iteration 1 to n (3062a, 3062b, 3062c) within remote server platform 306, each of the remote application iterations 1 to n retrieves and relies on application environment object data and application environment metadata within the corresponding application environment instance 1 to n (3064a, 3064b, 3064c). The application environment metadata and application environment object data is retrieved from computing device/on-premise device 302 and is stored within remote server platform 306 according to embodiments of the invention that are described in more detail below, for the purposes of enabling execution of remote application iterations 1 to n (3062a, 3062b, 3062c). In particular embodiments of the invention, retrieval of application environment metadata and application environment object data from computing device/on-premise device 302 is controlled or implemented by the concerned remote application iteration 1 to n (3062a, 3062b, 3062c)—which may be configured for network based communication with, and data retrieval from, on-premise device 302.

In embodiments of the invention where system environment 300A is used for remote execution of a plurality of remote application iterations 1 to n (3062a, 3062b, 3062c)

corresponding to a client application software, the system environment may rely on one or more data records to correlate client application software that is being remotely executed, with the plurality of running remote application iterations 1 to n (3062a, 3062b, 3062c), and with their respective application environment instances 1 to n (3064a, 3064b, 3064c), and additionally with the user that has initiated or is controlling the plurality of running remote application iterations 1 ton (3062a, 3062b, 3062c).

FIG. 3B illustrates an exemplary data structure 300B of a type that may be used to generated data records (of the kind described above), that may be used to correlate client application software that is being remotely executed, with the plurality of running remote application iterations.

As shown in FIG. 3B, exemplary data structure 300B comprises data fields 308 to 316.

Data field 308 is used to store a User ID associated with a particular remote application iteration that is being executed within system environment 300A. The User ID comprises a unique identifier associated with a user or a user account associated with the system environment 300A and which user or user account is responsible for or controls the execution of the corresponding one or more running or stored remote application iterations 3062a, 3062b, 3062c corresponding to a client application software within system environment 300A.

Data field 310 is used to store an Application ID associated with a particular remote application iteration that is being executed within system environment 300A. The Application ID comprises a unique identifier associated with the client application software, remote application iteration(s) whereof are being executed within system environment 300A.

Data field 312 is used to store a Remote Application Iteration ID for each remote application iteration that is being executed within system environment 300A. The Remote Application Iteration ID comprises a unique identifier associated with a specific remote application iteration corresponding to a client application software that is being executed within system environment 300A.

Data field 314 is used to store an Environment Instance ID associated with a particular remote application iteration that is being executed within system environment 300A. The Environment Instance ID comprises a unique identifier associated with a specific application environment instance that is generated for and coupled with a particular remote application iteration.

Data field 316 is used to store on-premise application information corresponding to a particular remote application iteration that is being executed within system environment 300A. The on-premise application information may comprise any information, network addresses, storage addresses, and/or other data location pointers, describing a computing device/on-premise device at which the on-premise client application software is installed, an application environment within the computing device/on-premise device that corresponds to the client application software, and/or one or more data objects corresponding to the client application software that are stored within the application environment.

It would be understood that one or more (or each) remote application iteration 3062a, 3062b, 3062c executed within system environment 300A may have (and in some embodiments would necessarily have) a corresponding data record of the type discussed in connection with FIG. 3B, wherein the data record would store the User ID, Application ID, Remote Application Iteration ID and Environment Instance ID corresponding to the remote application iteration. The data elements within the data record would enable processing entities within system environment 300A to correlate and appropriately retrieve and transmit data records and data messages between remote application iterations and their corresponding remote application environment instances, and a corresponding client application software or application environment that is implemented within a computing device/on-premise device—to enable execution of each such remote application iteration.

Moving back to FIG. 3A, in an alternate embodiment of the invention described above in connection with FIG. 3A, a plurality of remote application iterations 1 to n (3062a, 3062b, 3062c) may be configured to retrieve and rely on application environment object data and application environment metadata within a single application environment instance—i.e. any one of application environment instances 1 to n (3064a, 3064b, 3064c). In a more particular embodiment, each application environment instance 1 to n (3064a, 3064b, 3064c) may be associated with a specific user, and one more remote application iterations initiated by, operated by, controlled by, or associated with that specific user, may be configured to retrieve and rely on application environment object data and application environment metadata within the application environment instance associated with that same user.

FIG. 4 is a flowchart illustrating a method of executing a remote iteration of a client software application at a remote server platform based on dynamic retrieval of data from a computing device/on-premise device for provisioning an instance of a client software application environment maintained at the remote server platform. The method of FIG. 4 may be implemented partially or wholly within a remote server within a remote server platform (206, 306) of the type illustrated in FIGS. 2 and 3A.

Step 402 comprises instantiation of a remote application iteration at a remote server. The remote server may comprise a server within a remote server platform 206, 306 within system environment 200, 300A. The remote application iteration at the remote server may be instantiated in response to receiving an instruction (for example a user instruction or a system instruction) for instantiation. In a particular embodiment, the instruction for instantiation may include one or more of (i) information identifying the client software application for which a remote application iteration is intended to be run (for example, by way of an Application ID), (ii) information identifying a specific on-premise instance of a client software application and/or corresponding application environment, to which the remote application iteration corresponds, (iii) information identifying a user or user account instantiating or controlling the remote application iteration, and/or (iv) information identifying or describing an on-premise device at which the on-premise client application software is installed.

Step 404 comprises instantiating or generating at the remote server, an application environment instance corresponding to the remote application iteration that has been instantiated at step 402.

Step 406 comprises initiating at the remote server, execution of application software code corresponding to the remote application iteration instantiated at step 402. In an embodiment of the method, the application software code under execution may be retrieved from a memory associated with or communicably coupled with the remote server.

Step 408 comprises identifying one or more data object(s) required by the application software code under execution. In a particular embodiment, identification of the one or more data object(s) occurs after execution of the application software code has been initiated at step 406. The identified data object(s) may comprise one or more software data files required for execution of the application software code. As discussed above, the data objects may further comprise (i) application software data objects—comprising data objects that include application software code, application software libraries and application software data files, and/or (ii) user generated data objects—comprising user specific data or user generated data associated with operations of the application software code.

In a preferred embodiment, the identification of data object(s) at step 408 is an event based (or "dynamic") identification. The identification of data object(s) required for execution of the application software code may be achieved in multiple ways. In one embodiment, identification of a required data object is based on receiving from the application software code under execution, an application call, or application request or application data message requesting the data object. In another embodiment, identification of one or more data object(s) required for execution of the application software code may be a predictive identification—wherein the required data object(s) are identified based on predictive methods or algorithms, in advance of (or prior to) receiving (from the application software code under execution), an application call, or application request or application data message requesting the data object. In yet another embodiment, the identification of one or more data object(s) required for execution of the application software code may be a rule and event based identification—wherein the required data object(s) are identified based on detection of one or more events or one or more changes in data state, and the required data object(s) are identified based on one or more rules, indicia or heuristics that associate the detected event(s) or change(s) in state with one or more data object(s) that would be required for execution of the application software code.

Step 410 comprises determining whether the required data object(s) is/are available for retrieval within the application environment instance corresponding to the remote application iteration, that has been instantiated at step 404 (i.e. the application environment instantiated at the remote server).

In response to determining that the required data object(s) is/are not available for retrieval within the application environment instance corresponding to the remote application iteration, that has been instantiated at step 404-step 412 comprises initiating obtaining of the required data object(s) from an application environment maintained within a computing device/on-premise device at which a local instance of the client software application and corresponding data object(s) are available. In an embodiment, the computing device/on-premise device may be identified by the remote server, based on information received at step 402 or based on information extracted from the application software code under execution, or based on information received from the remote application iteration.

Step 414 comprises storing the data object(s) that has been retrieved from the computing device/on-premise device (at step 412), within the application environment instance that has been instantiated at step 404.

Step 416 comprises executing the application software code at the remote server, based on the one or more data object(s) that have been retrieved at step 412 and that are stored within the relevant application environment instance at step 414.

FIG. 5 is a communication flow diagram illustrating communication flow between system entities involved in implementing the method of FIG. 4.

At step 5002, remote server 502 receives an instruction for instantiating a remote application iteration at remote server 502. As discussed above, the instruction for instantiation may include one or more of (i) information identifying the client software application for which a remote application iteration is intended to be run (for example, by way of an Application ID), (ii) information identifying a client software application and/or corresponding application environment that is implemented within an on-premise device, and to which the remote application iteration corresponds, (iii) information identifying a user or user account instantiating or controlling the remote application iteration, and/or (iv) information identifying or describing an on-premise device at which the on-premise client application software is installed.

Responsive to receiving the instruction, remote server 502 (i) instantiates the remote application iteration, (ii) instantiates an application environment instance corresponding to this remote application iteration, and (iii) identifies one or more data object(s) required for execution of application software code corresponding to the remote application iteration that has been instantiated. As shown in FIG. 5, remote server 502 thereafter determines that the identified one or more data object(s) are not available within the application environment instance that corresponds to the remote application environment under execution.

Responsive to this determination, at step 5004, remote server 502 transmits to computing device/on-premise device 504, a request for retrieval of the identified data object(s). Computing device/on-premise device 504 may comprise a device at which a local instance of the client software application that corresponds to the remote application iteration, is available. In an embodiment, computing device/on-premise device 504 may be identified by remote server 502 based on information within the request received at step 5002, or based on information extracted from the application software code under execution, or based on information received from the remote application iteration.

Computing device/on-premise device 504 responds to the received request by retrieving the identified data object(s) from a memory associated or coupled with computing device/on-premise device 504. Step 5006 thereafter comprises transmitting the requested data object(s) from computing device/on-premise device 504 to remote server 506.

Remote server 502 stores the the data object(s) that has been transmitted at step 5006, and may subsequently use such data object(s) for executing application software code corresponding to the remote application iteration, at remote server 502.

FIG. 6 is a flowchart illustrating a method for dynamic retrieval of data or data object(s) from a computing device/on-premise device for provisioning an instance of a client software application environment maintained at a remote server platform. It would be understood that the method of dynamic retrieval of data as illustrated in FIG. 6 may be used for the purposes of implementing the method more generally described and illustrated above, in connection with FIGS. 4 and 5.

Step 602 of FIG. 6 comprises identifying, at a remote server one or more data object(s) required for provisioning an application environment instance corresponding to a remote application iteration that is being executed at the remote server (in accordance with the method of FIG. 4). As discussed in connection with step 408 of FIG. 4, in certain embodiments, the identified data object(s) may comprise one or more software data files required for execution the application code. As discussed above, the identified data object(s) may further comprise (i) application software data objects-comprising data objects that include application software code, application software libraries and application software data files, and/or (ii) user generated data objects-comprising user specific data or user generated data associated with operations of the application software code.

Additionally, as discussed in connection with step 408 of FIG. 4, the identification of data object(s) at step 602 may be an event based (or "dynamic") identification, and may include any of (i) identification of a required data object based on receiving from the application software code under execution, an application call, or application request or application data message requesting the data object, (ii) identification of one or more data object(s) by predictive identification—wherein the required data object(s) are identified based on predictive methods or algorithms, in advance of (or prior to) receiving (from the application software code under execution), an application call, or application request or application data message requesting the data object, and (iii) identification of one or more data object(s) by way of a rule and event based identification—wherein the required data object(s) are identified based on detection of one or more events or one or more changes in data state, and the required data object(s) are identified based on one or more rules, indicia or heuristics that associate the detected event(s) or change(s) in state with one or more data object(s) that would be required for execution of the application software code.

Step 604 comprises transmitting, from the remote server to a computing device/on-premise device, at which a local instance of the client software application and a corresponding on-premise application environment are maintained, a request for retrieval of the data object(s) identified at step 602. In an embodiment, the request for retrieval may be transmitted to the computing device/on-premise device in response to a prior determination that the required data object(s) is/are not available for retrieval within the application environment instance corresponding to the remote application iteration, that is being executed at the remote server.

Step 606 comprises retrieving at the computing device/on-premise device, and thereafter transmitting to the remote server, the requested one or more data object(s). In an embodiment, the one or more data object(s) are retrieved from a memory associated or coupled with the computing device/on-premise device. In another embodiment, the one or more data object(s) are retrieved from an on-premise application environment corresponding to the local instance of the concerned client application software that is maintained at the computing device/on-premise device.

Step 608 comprises additionally retrieving from the computing device/on-premise device, and thereafter transmitting to the remote server, metadata describing one or more data states associated with the on-premise application environment corresponding to the local instance of the concerned client application software that is maintained at the computing device/on-premise device. The metadata retrieved and transmitted at step 608 is application environment metadata—i.e. one or more data items, data elements or data records that describe attributes of a data file, data record, directory, folder, or file path within a file system. The attributes described by application environment metadata may include one or more of file size, file location, owner and type of the file, file access permissions (e.g. read, write, execute), owner and type of the directory, file contents within a directory, date of file creation, date of last file modification, date of directory creation, date of last directory modification etc.

In an embodiment of the method of FIG. 6, the metadata retrieved at step 608 is application environment metadata that is identified and selected for transmission, based on the one or more data object(s) that have been retrieved and transmitted to the remote server at step 606. In a more particular embodiment, the metadata retrieved at step 608 is application environment data associated with a file system directory or file system folder within a memory associated or coupled with the computing device/on-premise device, from which directory or folder at least one of the data object(s) transmitted at step 606 have been retrieved. In a yet more particular embodiment, the metadata retrieved at step 608 is application environment data associated with each file system directory or file system folder of the computing device/on-premise device from which the data object(s) transmitted at step 606 have been retrieved.

Step 610 comprises storing the data object(s) and the metadata received from the computing device/on-premise device, within the application environment instance that is being provisioned, and/or within a memory that is within or communicably coupled with the remote server and which memory is linked with, associated with or allocated to the application environment instance that is being provisioned at the remote server.

The data object(s) stored at step 610 may thereafter be used for executing application software code corresponding to the remote application iteration that is being executed at the remote server (as discussed above in connection with step 416 of FIG. 4).

The utilization of the metadata stored at step 610 for achieving the objectives of the invention is discussed in more detail below, in connection with FIGS. 10 and 11.

FIG. 7 is a communication flow diagram illustrating communication flow between system entities involved in implementing the method of FIG. 6.

Step 7002 of FIG. 7 comprises receiving at remote server 702, an instruction, input, or data message identifying one or more data object(s) that are required for provisioning an application environment instance corresponding to a remote application iteration that is being executed at the remote server. The identified data object(s) may comprise one or more software data files required for execution of the application software code. The identified data object(s) may further comprise (i) application software data objects-comprising data objects that include application software code, application software libraries and application software data files, and/or (ii) user generated data objects—comprising user specific data or user generated data associated with operations of the application software code.

At step 7004, remote server 702 transmits to computing device/on-premise device 704 (at which a local instance of the client software application and a corresponding on-premise application environment are maintained), a request for retrieval of the data object(s) identified at step 7002. In an embodiment, the request for retrieval may be transmitted to the computing device/on-premise device 704 in response to a prior determination that the required data object(s) is/are not available for retrieval within the application environment instance corresponding to the remote application iteration, that is being executed at the remote server.

Computing device/on-premise device 704 retrieves the requested one or more data object(s) from a memory associated or coupled with the computing device/on-premise device. In another embodiment, the one or more data object(s) are retrieved from the on-premise application environment corresponding to the local instance of the concerned client application software. Thereafter, step 7006 comprises transmitting from computing device/on-premise device 704 to remote server 702, the requested one or more data object(s).

Computing device/on-premise device 704 additionally retrieves from a memory within or communicably coupled therewith, metadata describing one or more data states associated with the on-premise application environment corresponding to the local instance of the concerned client application software.

At step 7008, the retrieved metadata is transmitted from computing device/on-premise device 704 to remote server 702. As discussed above (in connection with FIG. 6), the metadata retrieved and transmitted at step 7008 is application environment metadata—i.e. one or more data items, data elements or data records that describes attributes of a data file, data record, directory, folder, or file path within a file system. The attributes described by application environment metadata may include one or more of file size, file location, owner and type of the file, file access permissions (e.g. read, write, execute), owner and type of the directory, file contents within a directory, date of file creation, date of last file modification, date of directory creation, date of last directory modification etc.

In a particular embodiment, the metadata transmitted at step 7008 is application environment metadata that is identified and selected for transmission, based on the one or more data object(s) that have been retrieved and transmitted to the remote server at step 7006. In a more particular embodiment, the metadata transmitted at step 7008 is application environment data associated with a file system directory or file system folder within a memory associated or coupled with the on-premise device, from which directory or folder at least one of the data object(s) transmitted at step 7006 have been retrieved. In a yet more particular embodiment, the metadata transmitted at step 7008 is application environment data associated with each file system directory or file system folder of the computing device/on-premise device from which the data object(s) transmitted at step 7006 have been retrieved.

Step 7010 comprises transmitting from remote server 702 to the remote application iteration 706 that is under execution, the data object(s) received at step 7006. The data object(s) are transmitted for the purposes of provisioning the application environment instance corresponding to the remote application environment 706 that is under execution at remote server 702.

Step 7012 comprises transmitting from remote server 702 to the remote application iteration 706 that is under execution, the metadata received at step 7008—for the purposes of provisioning the application environment instance corresponding to the remote application environment 706 that is under execution at remote server 702.

Step 7014 comprises remote application iteration 706 provisioning the application environment instance that is associated with remote application iteration 706, with the received data object(s) and metadata.

FIG. 8 is a flowchart illustrating a method for identifying metadata and retrieving metadata from a computing device/on-premise device for provisioning an instance of a client software application environment maintained at a remote server platform. It would be understood that the method of FIG. 8 is implemented partially or wholly within a computing device/on-premise device from which a remote server seeks to retrieve data object(s) for provisioning an application environment instance corresponding to a remote application iteration that is under execution at the remote server. It will further be noted that in certain embodiments of the invention, the method of FIG. 8 may be used to implement step 608 of FIG. 6.

Step 802 comprises identifying at a computing device/on-premise device, a subset of the on-premise application environment for metadata retrieval and transmission. The a computing device/on-premise device is the device from which one or more data object(s) have been requested by a remote application iteration that is being executed at a remote server, The identification of the subset of the on-premise application environment within the a computing device/on-premise device, is based on attributes or storage location (within the computing device/on-premise device) of the one or more data object(s) that have been requested by the remote application iteration. The one or more data object(s) may already have been retrieved and transmitted from the computing device/on-premise device to the remote server. In a particular embodiment, the sub-set of the on-premise application environment that is identified comprises one or more file system directories or file system folders within a memory associated or coupled with the computing device/on-premise device, and directories or folders are identified within a file path that identifies a storage location of the one or more data object(s) (that have been requested by the remote application iteration) within a file system of the computing device/on-premise device. In a more specific embodiment, the sub-set of the on-premise application environment that is identified comprises (i) a first directory or folder within which the one or more data object(s) are stored within the computing device/on-premise device, and (ii) at least a second directory or folder identified within the file path that represents the storage location of the one or more data object(s) within the file system of the computing device/on-premise device—wherein the second directory or folder is distinct from the first directory or folder.

In a more specific embodiment, the sub-set of the on-premise application environment that is identified comprises (i) a first directory or folder within which the one or more data object(s) are stored within the computing device/on-premise device, and (ii) a plurality of additional directories or folders identified within the file path that represents the storage location of the one or more data object(s) within the file system of the computing device/on-premise device—wherein each of the additional directories or folders is distinct from the first directory or folder.

In an even more specific embodiment, the sub-set of the on-premise application environment that is identified comprises (i) a first directory or folder within which the one or more data object(s) are stored within the computing device/on-premise device, and (ii) all additional directories or folders identified within the file path that represents the storage location of the one or more data object(s) within the file system of the computing device/on-premise device—wherein each of the additional directories or folders is distinct from the first directory or folder.

Step 804 comprises retrieving metadata corresponding to the identified subset of the on-premise application environment, from a memory associated with the computing device/on-premise device. In an embodiment, the retrieved metadata may include one or more of file size, file location, file access permissions (e.g. read, write, execute, delete), file contents within a directory, date of file creation, date of last file modification, date of directory creation, date of last directory modification etc., corresponding to the identified subset of the on-premise application environment. In a further embodiment, the retrieved data includes one or more of file size, file location, file access permissions (e.g. read, write, execute, delete), file contents within a directory, date of file creation, date of last file modification, date of directory creation, date of last directory modification etc., corresponding to files and/or sub-directories or sub-folders within a file system directory or file system folder within a memory associated or coupled with the computing device/on-premise device. In embodiments where the identified subset of the on-premise application environment comprises a plurality of directories or folders (e.g. that are identified within a file path), the retrieved metadata may include one or more of file size, file location, file access permissions (e.g. read, write, execute, delete), file contents within a directory, date of file creation, date of last file modification, date of directory creation, date of last directory modification etc., corresponding to each of the plurality of directories or folders.

Step 806 comprises transmitting the retrieved metadata from the computing device/on-premise device to the remote server.

FIG. 9 is a flowchart illustrating a method for generating a metadata image of an on-premise application environment, for provisioning an instance of a client software application environment maintained at a remote server platform. The method of FIG. 9 may be implemented entirely or partially at a remote server at which a remote application iteration is under execution in accordance with the method of FIG. 4. In an embodiment, the method of FIG. 9 may be used to implement method step 610 of FIG. 6.

Step 902 comprises receiving, at an application environment instance implemented within the remote server, metadata transmitted from a computing device/on-premise device. The received metadata is metadata that has been transmitted to the remote server from the computing device/on-premise device in accordance with the method of FIG. 8. The received metadata corresponds to a subset of the on-premise application environment from which data object(s) have been retrieved for provisioning of an application environment instance that is implemented within the remote server, and which application environment instance corresponds to a remote application iteration being executed at the remote server.

Step 904 comprises modifying or generating (at the remote server) a metadata image of the on-premise application environment, based on the received metadata. In one embodiment, where the remote server does not have a previously generated metadata image of the on-premise application environment, the received metadata may be used to generate a new metadata image and store it within the application environment instance that corresponds to a remote application iteration being executed at the remote server. In another embodiment, where the remote server may have a previously generated metadata image of the on-premise application environment, and in which case, the received metadata may be used to modify the previously existing metadata image, or to substitute the previously existing metadata image, or to generate a second metadata image of the on-premise application environment.

The application of this modified or generated metadata image by the remote server is discussed in connection with FIG. 10 below.

FIG. 10 is a flowchart illustrating a method for requesting from a computing device/on-premise device, one or more data objects associated with a remote application iteration of a client application software that is being executed at a remote server platform. The method of FIG. 10 may be implemented entirely or partially at a remote server at which a remote application iteration is under execution in accordance with the method of FIG. 4.

Step 1002 comprises identifying at a remote server, a data object(s) required for execution of application software code corresponding to a remote application iteration that is hosted or being executed at the remote server. The identification of the data object(s) may be achieved in accordance with any of the embodiments discussed above in connection with step 408 of FIG. 4.

At step 1004, the remote server determines that the identified data object(s) is/are unavailable within an application environment instance that is stored within a memory associated with the remote server, and which corresponds to the remote application iteration.

Responsive to the determination at step 1004, step 1006 comprises parsing a metadata image retrieved from the application environment instance at the remote server, for the purpose of identifying any available metadata corresponding to the identified data object(s). It would be understood that metadata image that is parsed at step 1006 may comprise a metadata image generated in accordance with the method of FIG. 9.

The metadata corresponding to the identified data object(s) for which the metadata image is parsed may comprise any one one or more data items, data elements or data records that describes attributes of the one or more data object(s) that describe the storage and/or location of the data object(s) within a computing device/on-premise device. These data object attributes may include one or more of file size, file location, owner and type of the file, file access permissions (e.g. read, write, execute), owner and type of the directory, file contents within a directory, date of file creation, date of last file modification, date of directory creation, date of last directory modification etc., corresponding to an instance or a copy of the relevant data object as stored within the computing device/on-premise device.

Step 1008 comprises generating a request for retrieval of the identified data object(s) from the computing device/on-premise device, wherein parameters of the generated request are based on metadata parsed and extracted from the metadata image at step 1006.

Step 1010 comprises transmitting the generated request for retrieval of the identified data object(s) to the computing device/on-premise device from the remote server.

Thereafter, the identified data object(s) are retrieved from the computing device/on-premise device based on the metadata included within the generated request for retrieval of the identified data object(s)—and are transmitted back to the remote server.

FIG. 11 is a flowchart illustrating a specific method of generating a data object retrieval request for provisioning an instance of a client software application that is being executed at a remote server. The method of FIG. 11 may be implemented entirely or partially at a remote server at which a remote application iteration is under execution in accordance with the method of FIG. 4. It would be understood that the method of FIG. 11 may be implemented for executing method steps 1006 and 1008 described more generally in connection with FIG. 10.

Step 1102 comprises parsing a metadata image retrieved from an application environment instance stored within a remote server, for metadata corresponding to an identified data object(s) that is required by the remote server for executing a remote application iteration. The identified data object(s) are data object(s) that require to be requested from a computing device/on-premise device (as discussed in connection with step 1006 of FIG. 10).

Step 1104 comprises generating and transmitting to the computing device/on-premise device, a first type of data object retrieval request message. The first type of data object retrieval request message is generated and transmitted in response to successful retrieval of metadata corresponding to the identified data object(s) from the metadata image.

By way of further explanation, in the event the metadata image parsing at step 1102 identifies any available metadata corresponding to the required data object(s), the parameter attributes of the first type of data object retrieval request message (requesting retrieval of the identified data objects from the on-premise device) will include all or some of such metadata. These parameter attributes may thereafter be used by the computing device/on-premise device to optimally search for, retrieve and transmit the requested data object(s) to the remote server. Receiving such parameter attributes from the remote server has been found to significantly reduce the data and time overheads in the look-up and retrieval process, and has been found to make the overall process of data object retrieval from the computing device/on-premise device significantly faster and more efficient.

Alternatively, in the event parsing step 1102 does not result in identification and retrieval of metadata corresponding to the required data object(s) from the metadata image, step 1106 comprises generating and transmitting to the computing device/on-premise device, a second type of data object retrieval request message.

The second type of data object retrieval request message (requesting retrieval of the identified data objects from the computing device/on-premise device) will not include any data object attributes that describe the storage and/or location of the data object(s) within an on-premise device. In such case the computing device/on-premise device will search for and retrieve the requested data objects in a conventional manner. The computing device/on-premise device thereafter receives the data object retrieval request message and locates and transmits the requested data object(s) back to the remote server.

While the above methods describe retrieval of data object(s) required by a remote application iteration from a computing device/on-premise device, it would be understood that in the event that a remote server has multiple remote application iterations (and multiple corresponding application environment instances) running, a data object required by a first application iteration may optionally be retrieved from an application environment instance corresponding to a second application iteration of the same client application software that is being maintained at the remote server. In such embodiments, retrieving data object(s) from a locally stored instance of an application environment instance maintained by the remote server is likely to result in further data object search and retrieval efficiencies.

FIG. 12 illustrates a method that is implemented pursuant to method step 412 of the method of FIG. 4—i.e. pursuant to initiation of the step of obtaining a required data object(s) from an application environment maintained within a computing device/on-premise device at which a local instance of the client software application and corresponding data object(s) are available.

Pursuant to initiation of the step of obtaining a required data object (at step 412), step 1202 comprises transmitting from the remote server to the computing device/on-premise device, a request for the required data object. The transmitted request for the required data object includes file path data identifying a file path to the location of the required data object within the computing device/on-premise device, or within a memory associated with the computing device/on-premise device, or within a file system associated with the computing device/on-premise device.

Step 1204 comprises obtaining from the computing device/on-premise device first directory metadata corresponding to a first file system directory within which the required data object is stored on the computing device/on-premise device. In an embodiment, the first file system directory is identified or located based on the file path data included within the request for the required data object.

In an embodiment of the method, the first directory metadata comprises data that describes file contents within the first file system directory. In another embodiment, the first directory metadata comprises data that describes attributes of one or more data files, data records, directories, folders or file paths within the first file system directory.

Step 1206 comprises obtain from the computing device/on-premise device, second directory metadata comprising metadata corresponding to at least a second file system directory identified within the file path. In an embodiment, the second file system directory comprises (i) a root directory identified within the file path, or (ii) a parent directory of the first file system directory, or (iii) a child directory of the root directory, or (iv) a directory within the file path that is located between the root directory and the first file system directory.

In an embodiment of the method, the second directory metadata comprises data that describes file contents within at least the second file system directory. In another embodiment, the second directory metadata comprises data that describes attributes of one or more data files, data records, directories, folders or file paths within at least the second file system directory.

In a particular embodiment of the method, the second directory metadata obtained at step 1206 comprises metadata corresponding to each file system directory identified within the file path, other than the first file system directory.

The metadata obtained at steps 1204 and 1206 is application environment metadata—i.e. one or more data items, data elements or data records that describe attributes of a data file, data record, directory, folder, or file path within a file system. The attributes described by the metadata may include one or more of file size, file location, owner and type of the file, file access permissions (e.g. read, write, execute), owner and type of the directory, file contents within a directory, date of file creation, date of last file modification, date of directory creation, date of last directory modification etc.

Step 1208 comprises obtaining the required data object from the first file system directory.

In embodiments of each of steps 1204 to 1208, the step of obtaining the metadata (steps 1204, 1206) and/or obtaining the required data object (step 1208) comprises obtaining or retrieving the metadata/required data object from the file system associated with the computing device/on-premise device, and transmitting the obtained metadata/required data object to the remote server. The remote server thereafter proceeds with steps 414 and 416 of the method of FIG. 4.

In various embodiments of the invention, steps taken by the remote server after execution implementation of steps 1204 to 1208, includes one or more of (i) storing the computing device metadata and the required data object in a memory accessible by the remote server- and in a particular embodiment, within the application environment instance corresponding to the remote application iteration that is under execution at step 406 of the method of FIG. 4, and (ii) executing the application software code (that corresponds to the remote application iteration that is under execution at step 406 of the method of FIG. 4) based on the required data object that has been obtained from the computing device/on-premise device.

In an embodiment of the invention the remote server responds to obtaining or receiving the first directory metadata and the second directory metadata from the computing device/on-premise device, by generating or modifying a metadata image based on the received metadata (i.e. based on a part or whole of the first directory metadata and the second directory metadata). The metadata image is stored in a memory accessible by the remote server. In an embodiment the memory used to store the metadata image is associated with or is configured to permit access by the remote application environment instance (that corresponds to the remote application iteration that is under execution at step 406 of the method of FIG. 4) or by a user of the remote application environment instance.

In an embodiment where the metadata image is associated with or is configured to permit access by a specific remote application environment instance (that corresponds to the remote application iteration that is under execution at step 406 of the method of FIG. 4), metadata within the metadata image can be used for retrieval of additional data objects that are required from the computing device/on-premise device by the specific remote application environment instance in accordance with the method described in connection with FIG. 10.

In an embodiment where the metadata image is associated with or is configured to permit access by a user of a specific remote application environment instance (that corresponds to the remote application iteration that is under execution at step 406 of the method of FIG. 4), metadata within the metadata image can be used for retrieval of additional data objects that are required from the computing device/on-premise device by that specific remote application environment instance, and/or by one or more other remote application iterations that are associated with, or that have been instantiated by, the same user—in accordance with the method described in connection with FIG. 10.

In yet another embodiment where the metadata image is associated with or is configured to permit access by a user of a specific remote application environment instance (that corresponds to the remote application iteration that is under execution at step 406 of the method of FIG. 4), metadata within the metadata image can be used for retrieval of additional data objects that are required from the computing device/on-premise device by that specific remote application environment instance, or by one or more other remote application iterations or one or more application softwares that are associated with, or that have been instantiated by, the same user—in accordance with the method described in connection with FIG. 10.

FIG. 13 illustrates a more specific embodiment of the system environment 300 (that has been previously described in connection with FIG. 3A). In addition to the system environment elements/components that have been described previously in connection with FIG. 3A, FIG. 13 illustrates a further feature of system environment 300—wherein requests for data object(s) from the remote server platform 306 (or a remote server therewithin) are routed to computing device/on-premise device 302 through one or more software agents 3082a to 3082c—and optionally, wherein responses to the requests, including any retrieved metadata and/or data objects are routed back to remote server platform 306 (or to a remote server therewithin) through the one or more software agents 3082a to 3082c. Each software agent 3082a to 3082c is associated with a remote application iteration 3062a to 3062c, or with a user of the remote application iteration. Further, each of the software agent 3082a to 3082c is assigned or granted access rights to the file system of the computing device/on-premise device 302, wherein access granted to each software agent (3082a to 3082c) in respect of the file system of the computing device/on-premise device 302 is restricted to one or both of read access and write access to only those data objects that the associated remote application iteration 3062a to 3062c, or the associated user of the remote application iteration, has authorization to read access and/or write access.

This embodiment of system environment 300 may be used to implement the method of FIG. 12. In this implementation, the request for a data object (at step 1202) that is required by a remote application iteration 3062a to 3062c is transmitted from the remote server platform 306 (or a remote server therewithin) to a corresponding processor implemented software agent 3082a to 3082c that is associated with the remote application iteration or with a user of the remote application iteration. Thereafter, one or more of the steps of obtaining the computing device metadata from the computing device, obtaining the required data object from the first file system directory, and receiving the computing device metadata and the required data object in a memory accessible by the remote server, are implemented through the processor implemented software agent 3082a to 3082c to which the request has been transmitted by the remote server platform 306 (or a remote server therewithin).

FIG. 14 illustrates an exemplary remote server 1400 configured to implement the methods of the present invention.

Remote server 1400 may comprise any processor based server system configured for data processing operations and network based communication. In specific embodiments, remote server 1400 may comprise one or more servers. Remote server 1400 may include (i) an operator interface 1402 configured to enable an operator to configure or control the remote server 1400, (ii) processor 1404 configured for data processing operations within remote server 1400, (iii) transceiver 1406 configured for enabling network communication to and from remote server 1400, and (iv) memory 1408, which memory 1408 may include transitory memory and/or non-transitory memory.

In an exemplary embodiment, memory 1408 may have stored therewithin, (i) an operating system 1410 configured for managing device hardware and software resources and that provides common services for software programs implemented within remote server 1400, (ii) a processor implemented application iteration controller for generating and controlling the execution of one or more remote application iterations being executed at remote server 1400 in accordance with the methods discussed above, (iii) a processor implemented application environment instance controller 1414 configured for generating and controlling storage, retrieval and modification of application environment instances stored at remote server 1400 and that are associated with each remote application iteration that is being executed or stored at remote server 1400, (iv) a processor implemented iteration stack controller configured to enable multiple remote application iterations of a client software application to be simultaneously run and stored at remote server 1400, (v) a processor implemented intra-stack communication controller 1418 that is configured to enable messaging and data object retrieval between the multiple application environment instances corresponding to multiple remote application iterations for a single client application software that are simultaneously being maintained at remote server 1400, (vi) a processor implemented metadata image parser 1420 configured to parse metadata images stored at remote server 1400 (for example in accordance with the methods of FIG. 10 or 11 described above), (vii) a processor implemented messaging switch controller 1422 configured for switching between generation of first and second types of data object retrieval messages (in accordance with the methods discussed above in connection with FIG. 11), (viii) a processor implemented on-premise device communication controller 1424 configured to enable remote server 1400 to communicate with and retrieve data objects from on-premise device(s) (for example in accordance with the methods of FIG. 4 and FIG. 12), (ix) a processor implemented metadata image generator 1426 configured to generate or modify metadata images in accordance with the method of FIG. 9, and (x) a processor implemented database interface 1428 configured to enable processor 1404 to interface with, and retrieve data objects or metadata from stored application environment instances corresponding to the one or more remote application iterations being implemented or executed at remote server 1400.

It will be understood that remote server 1400 may be configured to implement one or more of the methods steps and process flows discussed above in connection with FIGS. 4 to 12.

FIG. 15 illustrates an exemplary computer system according to which various embodiments of the present invention may be implemented.

System 1500 includes computer system 1502 which in turn comprises one or more processors 1504 and at least one memory 1506. Processor 1504 is configured to execute program instructions—and may be a real processor or a virtual processor. It will be understood that computer system 1502 does not suggest any limitation as to scope of use or functionality of described embodiments. The computer system 1502 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1502 in accordance with the present invention may include one or more servers, desktops, laptops, tablets, smart phones, mobile phones, mobile communication devices, phablets and personal digital assistants. In an embodiment of the present invention, the memory 1506 may store software for implementing various embodiments of the present invention. The computer system 1502 may have additional components. For example, the computer system 1502 may include one or more communication channels 1508, one or more input devices 1510, one or more output devices 1512, and storage 1514. An interconnection mechanism (not shown) such as a bus, controller, or network, interconnects the components of the computer system 1502. In various embodiments of the present invention, operating system software (not shown) provides an operating environment for various softwares executing in the computer system 1502 using a processor 1504, and manages different functionalities of the components of the computer system 1502.

The communication channel(s) 1508 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1510 may include, but is not limited to, a touch screen, a keyboard, mouse, pen, joystick, trackball, a voice device, a scanning device, or any another device that is capable of providing input to the computer system 1502. In an embodiment of the present invention, the input device(s) 1510 may be a sound card or similar device that accepts audio input in analog or digital form. The output device(s) 1512 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1502.

The storage 1514 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1502. In various embodiments of the present invention, the storage 1514 may contain program instructions for implementing any of the described embodiments.

In an embodiment of the present invention, the computer system 1502 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1502. The method described herein is typically implemented as a computer program product, comprising a set of program instructions that is executed by the computer system 1502 or any other similar device. The set of program instructions may be a series of computer readable codes stored on a tangible medium, such as a computer readable storage medium (storage 1514), for example, diskette, CD-ROM, ROM, flash drives or hard disk, or transmittable to the computer system 1502, via a modem or other interface device, over either a tangible medium, including but not limited to optical or analogue communications channel(s) 1508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers multiple and significant advantages.

A principle advantage over the existing state of the art is that the invention enables dynamic or need based retrieval of data object(s) from on-premise devices, thereby reducing the time and network latency involved in provisioning an application environment that is necessary for execution of a remote application iteration, at a remote server.

The invention also enables users to run multiple remote iterations of the client application software within a remote server platform. In this aspect as well, the ability to implement dynamic or need based retrieval of data object(s) reduces the exponential increase in the data and network latency overheads that are typically observed in prior art systems that seek to enable multiple simultaneous cloud based iterations of a client software application. Further, by generating and maintaining an independent and distinct application environment instance corresponding to each remote application iteration of the same client application software that is being executed at the remote server, the invention ensures modularity and security of data corresponding to each remote application iteration.

Yet further, by relying on metadata previously obtained from an on-premise device to modulate the parameters of data object retrieval messages sent to an on-premise device from a remote server, the invention is able to significantly reduce the data and time overheads in the look-up and retrieval process, and has been found to make the overall process of data object retrieval from on-premise devices significantly faster and more efficient.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for execution of an application software iteration at a remote server through network based access to a computing device, the method comprising:
   instantiating at the remote server:
      a remote application iteration of a client application software, wherein the client application software has a corresponding local instance of an application environment stored on the computing device; and
      a remote application environment instance that is configured to permit access by the remote application iteration, wherein the remote application environment instance does not include all data objects stored within the local instance of an application environment stored on the computing device;
   executing at the remote server, application software code corresponding to the remote application iteration;
   identifying at least one data object required by the application software code;
   responsive to determining that the identified at least one data object is not available within the remote application environment instance, initiating obtaining of the identified at least one data object from the local instance of an application environment stored on the computing device, wherein the obtaining of the identified at least one data object comprises:
      transmitting to the computing device, a request for the identified at least one data object, the request comprising file path data identifying a file path, wherein the file path identifies a location of the at least one data object within a file system of the computing device;
      obtaining from the computing device, computing device metadata comprising:
         first directory metadata corresponding to a first file system directory within which the at least one data object is stored on the computing device; and
         second directory metadata comprising metadata corresponding to at least a second file system directory identified within the file path, wherein the second file system directory is distinct from the first file system directory;
      obtaining the identified at least one data object from the first file system directory;
      storing the computing device metadata and the at least one data object in a memory accessible by the remote server; and
   executing the application software code at the remote server based on the identified at least one data object.

2. The method as claimed in claim 1, wherein the second directory metadata comprises metadata corresponding to each file system directory identified within the file path, other than the first file system directory.

3. The method as claimed in claim 1, wherein:
   the first directory metadata describes file contents within the first file system directory; and
   the second directory metadata describes file contents within at least the second file system directory.

4. The method as claimed in claim 1, wherein:
   the first directory metadata comprises data that describes attributes of one or more data files, data records, directories, folders, or file paths within the first file system directory; and
   the second directory metadata comprises data that describes attributes of one or more data files, data records, directories, folders, or file paths within at least the second file system directory.

5. The method as claimed in claim 1, wherein the remote server:
   generates or modifies a metadata image based on the received computing device metadata; and
   stores the metadata image in the memory accessible by the remote server, wherein the memory is associated with one or both of the remote application environment instance and a user of the remote application environment instance.

6. The method as claimed in claim 5, wherein the remote server stores the received at least one data object in a memory that is configured to permit access by (i) only the remote application iteration or (ii) a plurality of application software iterations of one or more application softwares that are associated with the user of the remote application environment instance.

7. The method as claimed in claim 5, wherein obtaining the identified at least one data object from the local instance of an application environment stored on the computing device comprises:
   parsing the stored metadata image for metadata corresponding to the identified at least one data object; and
   responsive to retrieval of metadata corresponding to the identified at least one data object from the metadata image, transmitting to the computing device, a data object retrieval request message that includes all or some of the metadata retrieved from the metadata image.

8. The method as claimed in claim 7, wherein the identified at least one data object that is subsequently received from the computing device in response to the transmitted data object retrieval request message, is retrieved from the computing device based on the metadata included within the data object retrieval request message.

9. The method as claimed in claim 1, wherein:
   the request for the identified at least one data object is transmitted from the remote server to a processor implemented software agent that is associated with the remote application iteration or with a user of the remote application iteration;

the computing device is configured such that the processor implemented software agent is provided with access to the file system of the computing device; and the processor implemented software agent's access to the file system of the computing device is restricted to one or both of read access and write access to only such data objects that, the remote application iteration or the user of the remote application iteration, is authorized to access.

10. The method as claimed in claim 9, wherein one or more of the steps of obtaining the computing device metadata from the computing device, obtaining the identified at least one data object from the first file system directory, and receiving the computing device metadata and the at least one data object in the memory accessible by the remote server are implemented through the processor implemented software agent.

11. A system for execution of an application software iteration at a remote server through network based access to an on-premise device, the system comprising a remote server configured for:

instantiating:
a remote application iteration of a client application software, wherein the client application software has a corresponding local instance of an application environment stored on the computing device; and
a remote application environment instance that is configured to permit access by the remote application iteration, wherein the remote application environment instance does not include all data objects stored within the local instance of an application environment stored on the computing device;

executing at the remote server, application software code corresponding to the remote application iteration;

identifying at least one data object required by the application software code;

responsive to determining that the identified at least one data object is not available within the remote application environment instance, initiating obtaining of the identified at least one data object from the local instance of an application environment stored on the computing device, wherein the obtaining of the identified at least one data object comprises:
transmitting to the computing device, a request for the identified at least one data object, the request comprising file path data identifying a file path, wherein the file path identifies a location of the at least one data object within a file system of the computing device;
obtaining from the computing device, computing device metadata comprising:
first directory metadata corresponding to a first file system directory within which the at least one data object is stored on the computing device; and
second directory metadata comprising metadata corresponding to at least a second file system directory identified within the file path, wherein the second file system directory is distinct from the first file system directory;
obtaining the identified at least one data object from the first file system directory;
storing the computing device metadata and the at least one data object in a memory accessible by the remote server; and executing the application software code at the remote server based on the identified at least one data object.

12. The system as claimed in claim 11, wherein the second directory metadata comprises metadata corresponding to each file system directory identified within the file path, other than the first file system directory.

13. The system as claimed in claim 11, wherein:
the first directory metadata describes file contents within the first file system directory; and
the second directory metadata describes file contents within at least the second file system directory.

14. The system as claimed in claim 11, wherein:
the first directory metadata comprises data that describes attributes of one or more data files, data records, directories, folders, or file paths within the first file system directory; and
the second directory metadata comprises data that describes attributes of one or more data files, data records, directories, folders, or file paths within at least the second file system directory.

15. The system as claimed in claim 11, wherein the remote server is configured to:
generates or modifies a metadata image based on the received computing device metadata; and
stores the metadata image in the memory accessible by the remote server, wherein the memory is associated with one or both of the remote application environment instance and a user of the remote application environment instance.

16. The system as claimed in claim 15, wherein the remote server is configured to store the received at least one data object in a memory that is configured to permit access by (i) only the remote application iteration or (ii) a plurality of application software iterations of one or more application softwares that are associated with the user of the remote application environment instance.

17. The system as claimed in claim 15, wherein obtaining the identified at least one data object from the local instance of an application environment stored on the computing device comprises:
parsing the stored metadata image for metadata corresponding to the identified at least one data object; and
responsive to retrieval of metadata corresponding to the identified at least one data object from the metadata image, transmitting to the computing device, a data object retrieval request message that includes all or some of the metadata retrieved from the metadata image.

18. The system as claimed in claim 17, wherein the identified at least one data object that is subsequently received from the computing device in response to the transmitted data object retrieval request message, is retrieved from the computing device based on the metadata included within the data object retrieval request message.

19. The system as claimed in claim 11, wherein:
the request for the identified at least one data object is transmitted from the remote server to a processor implemented software agent that is associated with the remote application iteration or with a user of the remote application iteration;
the computing device is configured such that the processor implemented software agent is provided with access to the file system of the computing device; and
the processor implemented software agent's access to the file system of the computing device is restricted to one or both of read access and write access to only such data objects that, the remote application iteration or the user of the remote application iteration, is authorized to access.

20. The system as claimed in claim 19, wherein one or more of the steps of obtaining the computing device metadata from the computing device, obtaining the identified at least one data object from the first file system directory, and receiving the computing device metadata and the at least one data object in the memory accessible by the remote server are implemented through the processor implemented software agent.

21. A computer program product for execution of an application software iteration at a remote server through network based access to an on-premise device, comprising a non-transitory computer usable medium having a computer readable program code embodied therein, the computer readable program code comprising instructions for implementing within a processor based computing system, the steps of:

instantiating at the remote server:
- a remote application iteration of a client application software, wherein the client application software has a corresponding local instance of an application environment stored on the computing device; and
- a remote application environment instance that is configured to permit access by the remote application iteration, wherein the remote application environment instance does not include all data objects stored within the local instance of an application environment stored on the computing device;

executing at the remote server, application software code corresponding to the remote application iteration;

identifying at least one data object required by the application software code;

responsive to determining that the identified at least one data object is not available within the remote application environment instance, initiating obtaining of the identified at least one data object from the local instance of an application environment stored on the computing device, wherein the obtaining of the identified at least one data object comprises:

transmitting to the computing device, a request for the identified at least one data object, the request comprising file path data identifying a file path, wherein the file path identifies a location of the at least one data object within a file system of the computing device;

obtaining from the computing device, computing device metadata comprising:
- first directory metadata corresponding to a first file system directory within which the at least one data object is stored on the computing device; and
- second directory metadata comprising metadata corresponding to at least a second file system directory identified within the file path, wherein the second file system directory is distinct from the first file system directory;

obtaining the identified at least one data object from the first file system directory;

storing the computing device metadata and the at least one data object in a memory accessible by the remote server; and executing the application software code at the remote server based on the identified at least one data object.

* * * * *